United States Patent
Choi et al.

(10) Patent No.: US 11,903,018 B2
(45) Date of Patent: Feb. 13, 2024

(54) METHOD AND APPARATUS FOR PERFORMING UPLINK CHANNEL TRANSMISSION IN WIRELESS CELLULAR COMMUNICATION SYSTEM

(71) Applicant: Samsung Electronics Co., Ltd., Gyeonggi-do (KR)

(72) Inventors: Seunghoon Choi, Gyeonggi-do (KR); Youngbum Kim, Seoul (KR); Younsun Kim, Gyeonggi-do (KR); Taehyoung Kim, Seoul (KR); Sungjin Park, Incheon (KR); Taehan Bae, Seoul (KR); Jinyoung Oh, Seoul (KR)

(73) Assignee: Samsung Electronics Co., Ltd

( * ) Notice: Subject to any disclaimer, the term of this patent is extended or adjusted under 35 U.S.C. 154(b) by 100 days.

(21) Appl. No.: 16/631,731

(22) PCT Filed: Jul. 2, 2018

(86) PCT No.: PCT/KR2018/007473
§ 371 (c)(1),
(2) Date: Jan. 16, 2020

(87) PCT Pub. No.: WO2019/017614
PCT Pub. Date: Jan. 24, 2019

(65) Prior Publication Data
US 2020/0187226 A1  Jun. 11, 2020

(30) Foreign Application Priority Data

Jul. 19, 2017 (KR) .................. 10-2017-0091395
Jul. 31, 2017 (KR) .................. 10-2017-0097218

(51) Int. Cl.
*H04W 72/566* (2023.01)
*H04W 72/0453* (2023.01)

(52) U.S. Cl.
CPC ..... *H04W 72/566* (2023.01); *H04W 72/0453* (2013.01)

(58) Field of Classification Search
CPC .................. H04W 72/1247; H04W 72/0453
See application file for complete search history.

(56) References Cited

U.S. PATENT DOCUMENTS 10,225,826 B2 * 3/2019 Tiirola ............... H04L 25/0224
2014/0050205 A1  2/2014 Ahn et al.
(Continued)

FOREIGN PATENT DOCUMENTS

KR  1020140111655   9/2014
KR  1020160143657   12/2016
(Continued)

OTHER PUBLICATIONS

PCT/ISA/210 Search Report issued on PCT/KR2018/007473, pp. 7.
PCT/ISA/237 Written Opinion issued on PCT/KR2018/007473, pp. 6.
Samsung, "On Simultaneous PUSCH and PUCCH Transmissions", R1-1710711, 3GPP TSG RAN WG1 NR ad-Hoc#2, Jun. 27-30, 2017, 3 pages.
(Continued)

*Primary Examiner* — Rhonda L Murphy
(74) *Attorney, Agent, or Firm* — The Farrell Law Firm, P.C.

(57) ABSTRACT

Disclosed are a communication technique for merging, with IoT technology, a 5G communication system for supporting a data transmission rate higher than that of a 4G system, and a system therefor. The present disclosure can be applied to intelligent services (for example, smart home, smart building, smart city, smart car or connected car, healthcare, digital education, retail, security and safety related services) on the basis of 5G communication technology and IoT-related technology. The present invention relates to a method and apparatus for performing uplink transmission in a wireless communication system.

11 Claims, 9 Drawing Sheets

(56) References Cited

U.S. PATENT DOCUMENTS

| | | |
|---|---|---|
| 2015/0333879 A1 | 11/2015 | Yang et al. |
| 2017/0012692 A1 | 1/2017 | Kim et al. |
| 2017/0188311 A1 | 6/2017 | Hwang et al. |
| 2017/0208590 A1 | 7/2017 | Kim et al. |
| 2018/0167933 A1* | 6/2018 | Yin ................. H04L 5/0051 |
| 2020/0205165 A1* | 6/2020 | Huang ............. H04W 72/0446 |
| 2020/0214001 A1* | 7/2020 | Chen ................. H04L 5/0051 |

FOREIGN PATENT DOCUMENTS

| | | |
|---|---|---|
| WO | WO 2013/048188 | 4/2013 |
| WO | WO 2015/126130 | 8/2015 |
| WO | WO 2015/156486 | 10/2015 |

OTHER PUBLICATIONS

Korean Office Action dated Nov. 29, 2021 issued in counterpart application No. 10-2017-0097218, 9 pages.

Sharp, "PUCCH and PUSCH Multiplexing Methods", R1-1711244, 3GPP TSG RAN WG1 NR Ad-Hoc#2, Jun. 27-30, 2017, 3 pages.

Huawei, HiSilicon, "Multiplexing of PUCCH and PUSCH" R1-1710464, 3GPP TSG RAN WG1 NR Ad-Hoc Meeting, Jun. 27-30, 2017, 3 pages.

Samsung, "UE-Group CSI Reporting", R1-1708012, 3GPP TSG RAN WG1 #89, May 15-19, 2017, 2 pages.

Korean Office Action dated Nov. 8, 2022 issued in counterpart application No. 10-2017-0097218, 5 pages.

* cited by examiner

METHOD AND APPARATUS FOR PERFORMING UPLINK CHANNEL TRANSMISSION IN WIRELESS CELLULAR COMMUNICATION SYSTEM

PRIORITY

This application is a National Phase Entry of PCT International Application No. PCT/KR2018/007473 which was filed on Jul. 2, 2018, and claims priority to Korean Patent Application Nos. 10-2017-0091395 and 10-2017-0097218, which were filed on Jul. 19, 2017 and Jul. 31, 2017, respectively, the content of each of which is incorporated herein by reference.

TECHNICAL FIELD

The disclosure relates to a method and apparatus for performing uplink transmission in a wireless communication system.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered.

In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has evolved into an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

In order to process mobile data traffic, the amount of which has explosively increased in recent years, a 5th generation (5G) system, which is a next generation telecommunication system beyond long-term evolution (LTE), evolved universal terrestrial radio access (E-UTRA), and LTE-advanced (LTE-A) or E-UTRA evolution, has been actively discussed. The 5G system aims for an ultra-high speed data service of up to several Gbps by using an ultra-wide bandwidth. To this end, the ultra-high frequency bands of several GHz or tens of GHz are considered as candidate frequencies for an operating frequency band of the 5G system. In the ultra-high frequency band described above, the pathloss of a radio wave increases in proportion to a frequency band, so that the coverage of a mobile communication system becomes smaller. Therefore, a beamforming technique for concentrating radiation energy of a radio wave onto a predetermined destination by using a plurality of antennas so as to increase an arrival distance of the radio wave is becoming more important.

DISCLOSURE OF INVENTION

Technical Problem

In the case where uplink transmission at a plurality of uplink frequencies is configured for the terminal, performing uplink transmission simultaneously at different uplink frequencies may cause an interference problems due to harmonics and inter-modulation products. Accordingly, an objective of the disclosure is to provide a method and apparatus for performing uplink transmission through only one uplink frequency band at a time by considering a timing advance (TA) value according to each uplink frequency.

In the case where LTE uplink transmission and new radio (NR) uplink transmission at one uplink frequency are configured for a terminal, simultaneous performing of the LTE uplink transmission and the NR uplink transmission may cause an interference problem due to harmonics and inter-modulation products. Accordingly, another objective of the disclosure is to provide a method and apparatus for performing NR or LTE uplink transmission simultaneously by considering a TA value according to each of the LTE and the NR uplink transmission.

In the case where uplink transmission and downlink reception at different frequencies are configured for a terminal, self-interference may be caused in downlink reception of the terminal due to harmonics and inter-modulation products of uplink transmissions at different specific frequencies. Accordingly, still another objective of the disclosure is to provide a method and apparatus for performing downlink transmission or uplink transmission simultaneously by considering a TA value according to uplink transmission at an uplink frequency.

Solution to Problem

In order to solve the above problem, a method of a terminal according to an embodiment may include: determining a first transmission interval of a first signal, scheduled for a first frequency, and a second transmission interval of a second signal, scheduled for a second frequency; determining whether the first transmission interval and the second transmission interval overlap each other; determining a priority of the first signal and the second signal if the first transmission interval and the second transmission interval at least partially overlap each other; and performing communication with a base station according to the determined priority during a time period in which the first transmission interval and the second transmission interval overlap each other.

The signal having the higher priority between the first signal and the second signal is transmitted or received during the time period in which the first transmission interval and the second transmission interval overlap each other, and a signal having a lower priority therebetween is partially or entirely dropped.

The priority is determined based on at least one of a communication system of the first signal and the second signal, a sequence of the first transmission interval and the second transmission interval on the time axis, a cell of the first frequency and the second frequency, a channel type of the first signal and the second signal, a type of information included in the first signal and the second signal, a payload size of the first signal and the second signal, and a transmission power of the first signal and the second signal.

Determining whether the first transmission interval and the second transmission interval overlap each other further includes comparing a timing advance (TA) for the first signal with a TA for the second signal.

In order to solve the above problem, a terminal according to an embodiment may include: a transceiver configured to transmit or receive a signal; and a controller configured to determine a first transmission interval of a first signal, scheduled for a first frequency, and a second transmission interval of a second signal, scheduled for a second frequency, determine whether the first transmission interval and the second transmission interval overlap each other, determine a priority of the first signal and the second signal if the first transmission interval and the second transmission interval at least partially overlap each other, and perform communication with a base station according to the determined priority during a time period in which the first transmission interval and the second transmission interval overlap each other.

In order to Solve the above problem, a method of a base station according to an embodiment includes: transmitting a signal for scheduling transmission of a first signal at a first frequency to a terminal; transmitting a signal for scheduling transmission of a second signal at a second frequency to the terminal; and performing communication with the terminal according to a priority determined for the first signal and the second signal during a time period in which the first transmission interval of the first signal and the second transmission interval of the second signal at least partially overlap each other.

In order to solve the above problem, a base station according to an embodiment may include: a transceiver configured to transmit or receive a signal; and a controller configured to transmit a signal for scheduling transmission of a first signal at a first frequency to a terminal, transmit a signal for scheduling transmission of a second signal at a second frequency to the terminal, and perform communication with the terminal according to a priority determined for the first signal and the second signal during a time period in which the first transmission interval of the first signal and the second transmission interval of the second signal at least partially overlap each other.

Advantageous Effects of Invention

According to an embodiment of the disclosure, by providing a method and apparatus for performing uplink transmission by considering a TA value according to uplink transmission, it is possible to solve an interference problem and a self-interference problem due to harmonics and inter-modulation products that may be generated according to a configuration related to uplink transmission of a terminal.

MODE FOR THE INVENTION

Figure 1:
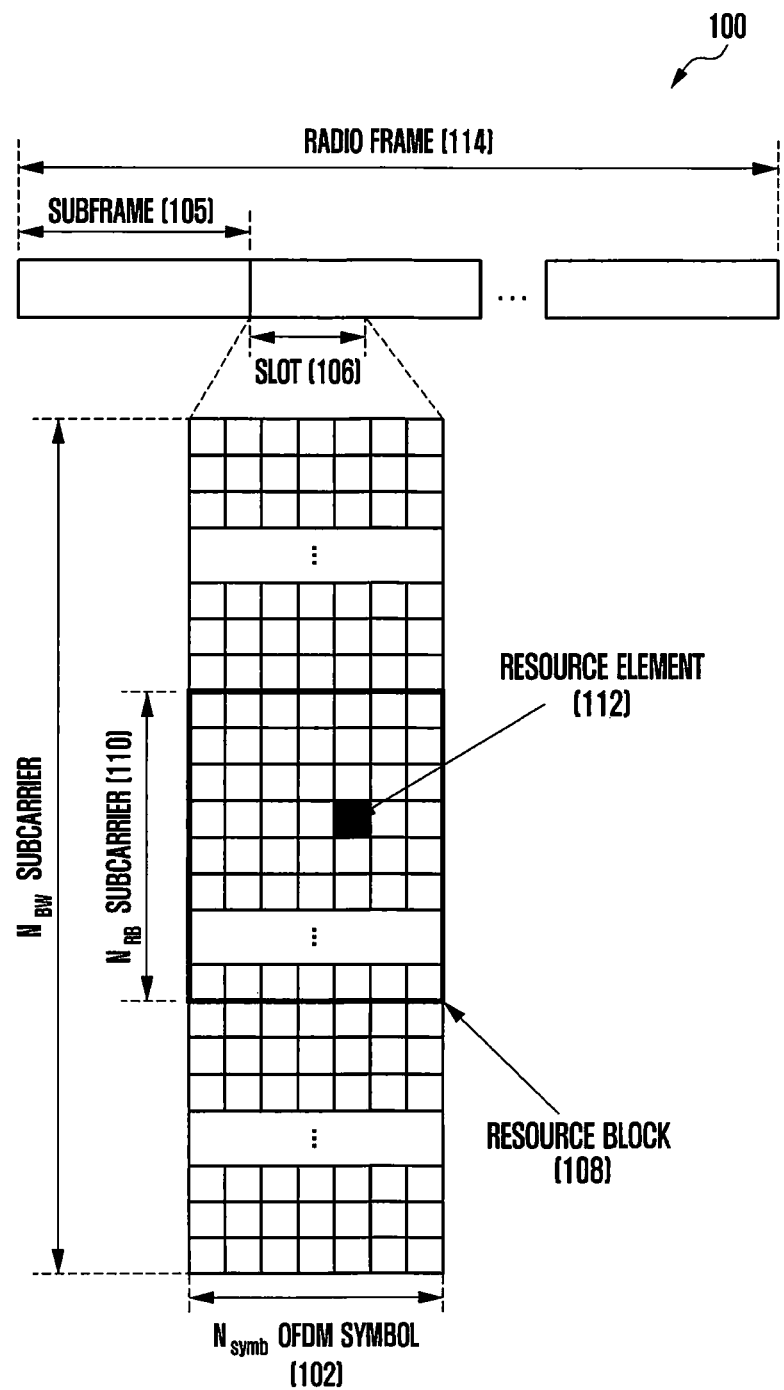
FIG. 1 illustrates a basic structure of a time-frequency domain of an LTE system.

Hereinafter, embodiments of the disclosure will be described in detail in conjunction with the accompanying drawings. In the following description of the disclosure, a detailed description of known functions or configurations incorporated herein will be omitted when the same may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be made apparent with reference to the embodiments described below in detail in conjunction with the accompanying drawings. However, the disclosure is not limited to the embodiments set forth below, and may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, executed via the processor of the computer or other programmable data processing apparatus, generate means for implementing the functions specified in the flowchart block or blocks. These computer program instructions may also be stored in a computer-usable or computer-readable memory that can direct a computer or other programmable data processing apparatus to function in a particular manner such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions executed on the computer or other programmable apparatus provide steps for implementing the functions specified in the flowchart block or blocks.

Further, each block of the flowchart illustrations may represent a module, segment, or portion of code that includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, "unit" refers to a software element or a hardware element, such as a Field Programmable Gate Array (FPGA) or an Application Specific Integrated Circuit (ASIC), which performs a predetermined function. However, "unit" does not always have a meaning limited to software or hardware. The "unit" may be constructed either to be stored in an addressable storage medium or to execute on one or more processors. Therefore, the "unit" includes, for example, software elements, object-oriented software elements, class elements or task elements, processes, functions, properties, procedures, sub-routines, segments of a program code, drivers, firmware, micro-codes, circuits, data, databases, data structures, tables, arrays, and parameters. The elements and functions provided by the "unit" may either be combined into a smaller number of elements or, "units" or may be divided into a larger number of elements or "units". Moreover, the elements and "units" may be implemented to reproduce one or more CPUs within a device or a security multimedia card.

Further, in the detailed description of embodiments of the disclosure, an Advanced E-UTRA (also referred to as LTE-A) system supporting cooperative communication (CoMP) is mainly discussed. However, the main idea of the disclosure is applicable to other communication systems having similar technical backgrounds or channel types through slight modification of the type that can be made by one skilled in the art without departing from the scope of the disclosure. For example, the main idea of the disclosure may be applied to a multicarrier high speed packet access (HSPA) supporting carrier aggregation.

Meanwhile, research enabling new 5G communication (referred to as new radio (NR) communication in the disclosure) and conventional LTE communication to coexist in the same spectrum in a mobile communication system is ongoing.

The disclosure relates to a wireless communication system, and more particularly to a method and an apparatus for enabling different wireless communication systems to coexist in a single carrier frequency or multiple carrier frequencies, and enabling a terminal, which is capable of transmitting or receiving data in at least one communication system among different communication systems, to transmit or receive data to or from each communication system.

In general, a mobile communication system is developed to provide voice services while guaranteeing the mobility of users. However, the wireless communication system has been expanded from voice services to a data service. In recent years, the wireless communication system has been developed to provide a high-speed data service. However, since resources are lacking and users demand faster services from mobile communication systems currently providing service, a more improved mobile communication system is needed.

To meet the demands, standardization of long term evolution (LTE), as one of the next generation mobile communication systems that are being developed, is being performed under the 3rd generation partnership project (3GPP). LTE is a technology for implementing high speed packet based communication with a transmission rate of up to about 100 Mbps. To this end, several methods are under discussion, including a method of reducing the number of nodes located on a communication channel by simplifying a network architecture, a method of making wireless protocols closest to a wireless channel, and the like.

If decoding fails upon initial transmission, the LTE system employs hybrid automatic repeat request (HARQ) of retransmitting the corresponding data in a physical layer. In the HARQ scheme, in the case where a receiver fails to accurately decode data, the receiver transmits negative acknowledgement (NACK) indicating failure of decoding to a transmitter, so that the transmitter may retransmit the corresponding data in a physical layer. The receiver combines data retransmitted by the transmitter with previous data, decoding of which has failed, whereby data reception performance may increase. Further, in the case where the receiver accurately decodes data, the receiver transmits information (ACK) reporting that decoding has been successfully executed, so that the transmitter transmits new data.

FIG. 1 illustrates a basic structure of a time-frequency domain, which is a radio resource area where data or a control channel is transmitted in a downlink of an LTE system.

Referring to FIG. 1, the horizontal axis indicates the time domain, and the vertical axis indicates the frequency domain. In the time domain, the minimum transmission unit is an OFDM symbol. One slot 106 includes $N_{symb}$ OFDM symbols 102, and one subframe 105 includes two slots. The length of one slot is 0.5 ms, and the length of one subframe is 1.0 ms. A radio frame 114 is the time-domain section including 10 subframes. In the frequency domain, the minimum transmission unit is a subcarrier, and the entire system transmission bandwidth may include a total of $N_{BW}$ subcarriers 104.

In the time-frequency domain, the basic resource unit is a resource element (RE) 112, and an RE is expressed by an OFDM symbol index and a subcarrier index. A resource block (RB) (or physical resource block (PRB) 108 is defined by $N_{symb}$ consecutive OFDM symbols 102 in the time domain and NRB consecutive subcarriers 110 in the frequency domain. Therefore, one RB 108 includes $N_{symb} \times N_{RB}$ REs 112. Generally, the minimum transmission unit of data is an RB. In the LTE system, generally, $N_{symb}$=7 and $N_{RB}$=12. $N_{BW}$ is proportional to a system transmission bandwidth. A data rate increases in proportion to the number of RBs scheduled for a terminal. In LTE system, six transmission bandwidths are defined and used. In the case of an FDD system, in which downlink and uplink are divided on the basis of frequencies, the downlink transmission bandwidth and the uplink transmission bandwidth may be different from each other. A channel bandwidth may indicate an RF bandwidth corresponding to a system transmission bandwidth. Table 1 provided below indicates the relationship between a system transmission bandwidth and a channel bandwidth defined in the LTE system. For example, when the LTE system has a channel bandwidth of 10 MHz, the transmission bandwidth may include 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information is transmitted within the first N OFDM symbols in the subframe. Generally, N={1, 2, 3}. Therefore, the value of N may be changed for each subframe based on the amount of control information to be transmitted in the current subframe. The control information may include a control channel transmission interval indicator indicating the number of OFDM symbols via which control information is to be transmitted, scheduling information associated with downlink data or uplink data, a HARQ ACK/NACK signal, or the like.

In the LTE system, scheduling information associated with downlink data or uplink data may be transmitted from a base station to a terminal via downlink control information (DCI). An uplink (UL) refers to a radio link via which a terminal transmits data or a control signal to a base station, and a downlink (DL) refers to a radio link via which a base station transmits data or a control signal to a terminal. The DCI is defined in various formats. A DCI format may be determined and applied for operation, based on whether scheduling information is for uplink data (UL grant) or for downlink data (DL grant), whether it is compact DCI of which the control information is small, whether spatial multiplexing using multiple antennas is applied, whether it is used for controlling power, and the like. For example, DCI format 1 corresponding to scheduling control information on downlink data (DL grant), may be configured to include at least the following control information.

Resource allocation type 0/1 flag: provides notification of whether a resource allocation method is type 0 or type 1. Type 0 applies a bitmap scheme and allocates resources in units of resource block groups (RBGs). In the LTE system, a basic scheduling unit is a resource block (RB), expressed by time and frequency domain resources, and an RBG includes a plurality of RBs and is used as a basic scheduling unit in the type 0 scheme. Type 1 allows allocation of a predetermined RB in an RBG.

Resource block assignment: provides notification of RBs allocated for data transmission. An expressed resource is determined according to the system bandwidth and resource allocation scheme.

Modulation and coding scheme (MCS): provides notification of the modulation scheme used for data transmission and the size of a transport block of data to be transmitted.

HARQ process number: provides notification of the process number of HARQ.

New data indicator: provides notification of whether HARQ initial transmission or retransmission occurs.

Redundancy version: provides notification of the redundancy version of HARQ.

Transmission power control (TPC) command for a physical uplink control channel (PUCCH): provides notification of a transmission power control command for a PUCCH, which is an uplink control channel.

The DCI is transmitted via a physical downlink control channel (PDCCH) or an enhanced PDCCH (EPDCCH), which is a downlink physical control channel, after passing through a channel coding and modulation process.

Generally, the DCI is channel-coded independently for each terminal, and is then configured as an independent PDCCH and transmitted. In the time domain, a PDCCH is mapped and transmitted during the control channel transmission interval. The frequency-domain mapping position of a PDCCH is determined by the identifier (ID) of each terminal, and is propagated to the entire system transmission band.

Downlink data is transmitted via a physical downlink shared channel (PDSCH), which is a physical channel for downlink data transmission. The PDSCH is transmitted following the control channel transmission interval, and scheduling information, such as a modulation scheme or a specific mapping position in the frequency domain, is indicated by DCI transmitted via the PDCCH.

Via an MCS configured by 5 bits in the control information included in the DCI, a base station may report the modulation scheme applied to a PDSCH to be transmitted to a terminal and the size (transport block size (TBS)) of data to be transmitted. The TBS corresponds to the size of data (transport block (TB)) that the base station desires to transmit before channel coding for error correction is applied to the data.

The modulation schemes supported by the LTE system include quadrature phase shift keying (QPSK), 16 quadrature amplitude modulation (16QAM), and 64QAM. Modulation orders ($Q_m$) thereof correspond to 2, 4, and 6 respectively. That is, in the case of QPSK modulation, 2 bits are transmitted per symbol. In the case of 16QAM modulation, 4 bits are transmitted per symbol. In the case of 64QAM modulation, 6 bits are transmitted per symbol.

In 3GPP LTE Rel-10, a bandwidth extension technology has been adopted in order to support a larger amount of data transmission than LTE Rel-8. The technology called "bandwidth extension" or "carrier aggregation (CA)" may extend a band beyond that of an LTE Rel-8 terminal for transmitting data in one band, and may thus increase the amount of data transmission by an amount corresponding to the extended band. Each of the bands is referred to as a component carrier (CC), and an LTE Rel-8 terminal is defined as having one component carrier for each of the downlink and the uplink. In addition, a CC group including a downlink CC and an uplink CC connected to the downlink CC via SIB-2 is referred to as a cell. The SIB-2 connection relationship between the downlink CC and the uplink CC is transmitted via a system signal or a higher layer signal. A terminal that supports CA may receive downlink data and transmit uplink data through a plurality of serving cells.

In Rel-10, in a situation where a base station has difficulty transmitting a physical downlink control channel (PDCCH) to a specific terminal in a specific serving cell, the base station transmits a PDCCH in another serving cell and configures a carrier indicator field (CIF), which is a field indicating that the corresponding PDCCH indicates a physical downlink shared channel (PDSCH) or physical uplink shared channel (PUSCH) of another serving cell. The CIF may be configured for a terminal that supports CA. The CIF is determined to indicate a different serving cell by adding three bits to the PDCCH information in a specific serving cell. The CIF is included only when performing cross carrier scheduling, and in the case where the CIF is not included, the base station does not perform cross carrier scheduling. In the case where the CIF is included in downlink allocation information (DL assignment), the CIF indicates the serving cell to which a PDSCH scheduled by DL assignment is to be transmitted, and in the case where the CIF is included in uplink resource allocation information (UL grant), the CIF is defined to indicate the serving cell to which the PUSCH scheduled by the UL grant is to be transmitted.

As described above, in LTE-10, carrier aggregation (CA), which is a bandwidth extension technology, is defined, and a plurality of serving cells may be configured for a terminal. Further, the terminal periodically or aperiodically transmits channel information about a plurality of serving cells to a base station in order for the base station to perform data scheduling. The base station schedules and transmits data for each carrier, and the terminal transmits A/N feedback with respect to data transmitted for each carrier wave. In LTE Rel-10, a terminal is designed to transmit a maximum of 21 bits of A/N feedback, and in the case where transmission of A/N feedback and transmission of channel information overlap in one subframe, according to design, A/N feedback is transmitted and channel information is discarded. In LTE Rel-11, the design is configured such that channel information of one cell and A/N feedback are multiplexed, so that a maximum of 22 bits of A/N feedback and channel information of one cell is transmitted via PUCCH format 3 in transmission resources of PUCCH format 3.

In LTE-13, a scenario in which a maximum of 32 serving cell is configured is assumed. The number of serving cells is extended up to a maximum of 32 serving cells by using an unlicensed band in addition to a licensed band. In addition, by taking into consideration that the number of licensed bands, such as LTE frequencies, is limited, LTE service is also provided in an unlicensed band, such as 5 GHz band, which is called "licensed assisted access (LAA)". LAA applies carrier aggregation technology of LTE so as to support operation of an LTE cell, which is in a licensed band, as a Pcell, and operation of an LAA cell, which is in an unlicensed band, as a Scell. Therefore, in the same manner as LTE, feedback generated in an LAA cell, which is a Scell, needs to be transmitted only in a Pcell, and a downlink subframe and an uplink subframe may be freely applied to the LAA cell. Unless otherwise described herein, LTE includes all technologies evolved from LTE, such as LTE-A and LAA.

Meanwhile, since a post-LTE communication system, that is, a 5th generation wireless cellular communication system (hereinafter referred to as 5G or NR) needs to freely satisfy various requirements of a user, a service provider, and the like, service satisfying various requirements may be supported thereby.

Accordingly, 5G may define various 5G-oriented services, such as enhanced mobile broadband communication (eMBB: herein referred to as eMBB), massive machine type communication (mMTC: referred to herein as mMTC), and ultra-reliable and low-latency communications (URLLC: herein referred to as URLLC), as a technology for satisfying requirements selected for various 5G-oriented services from among requirements, such as a terminal maximum transmission speed of 20 Gbps, a terminal maximum speed of 500 km/h, a maximum delay time of 0.5 ms, a terminal access density of 1,000,000 terminals/km2, and the like.

For example, in order to provide eMBB in 5G, from the perspective of a single base station, a terminal maximum transmission speed of 20 Gbps needs to be provided in a downlink, and a terminal maximum transmission speed of 10 Gbps needs to be provided in an uplink. At the same time, a terminal average transmission speed, which is noticeable upon practical application, needs to be increased. In order to satisfy the requirements, transmission/reception technology including further enhanced multiple-input multiple-output transmission technology needs to be improved.

At the same time, in 5G, mMTC is under consideration in order to support application services, such as those of the Internet of Things (IoT). The mMTC requires massive terminal access support in a cell, improved terminal coverage, prolonged battery lifetime, decreased terminal expenses, and the like in order to efficiently support the IoT. Since the IoT is attached to various sensors and various devices to provide a communication function, the IoT needs to support a large number of terminals (e.g., 1,000,000 terminals/km2) in a cell. Further, due to the service characteristics, since the mMTC has a high possibility of being located in a shadow area, such as the basement of a building or an area that a cell does not cover, the mMTC requires coverage wider than the coverage provided by eMBB. The mMTC has a high possibility of being configured using low-cost terminals, and it is difficult to frequently exchange a battery of the terminal, and thus a very long battery life time is required.

Finally, in the case of URLLC, the URLLC is cellular-based wireless communication used for specific purposes, is a service used for remote control of a robot or a machine, industrial automation, an unmanned aerial vehicle, remote health control, emergency situation notification, etc., and needs to provide communication having ultra-low latency and ultra-high reliability. For example, the URLLC needs to satisfy a maximum delay time shorter than 0.5 ms, and at the same time, needs to provide a packet error rate equal to or lower than $10^{-5}$. Therefore, for the URLLC, a transmit time interval (TTI) smaller than that of a 5G service, such as eMBB, needs to be provided, and at the same time, a design capable of allocating a large amount of resources in a frequency band is required.

Services considered for the 5G wireless cellular communication system described above needs to be provided in a single framework. That is, for efficient resource management and control, various services may be integrated, controlled, and transmitted as one system rather than operated independently.

Figure 2:
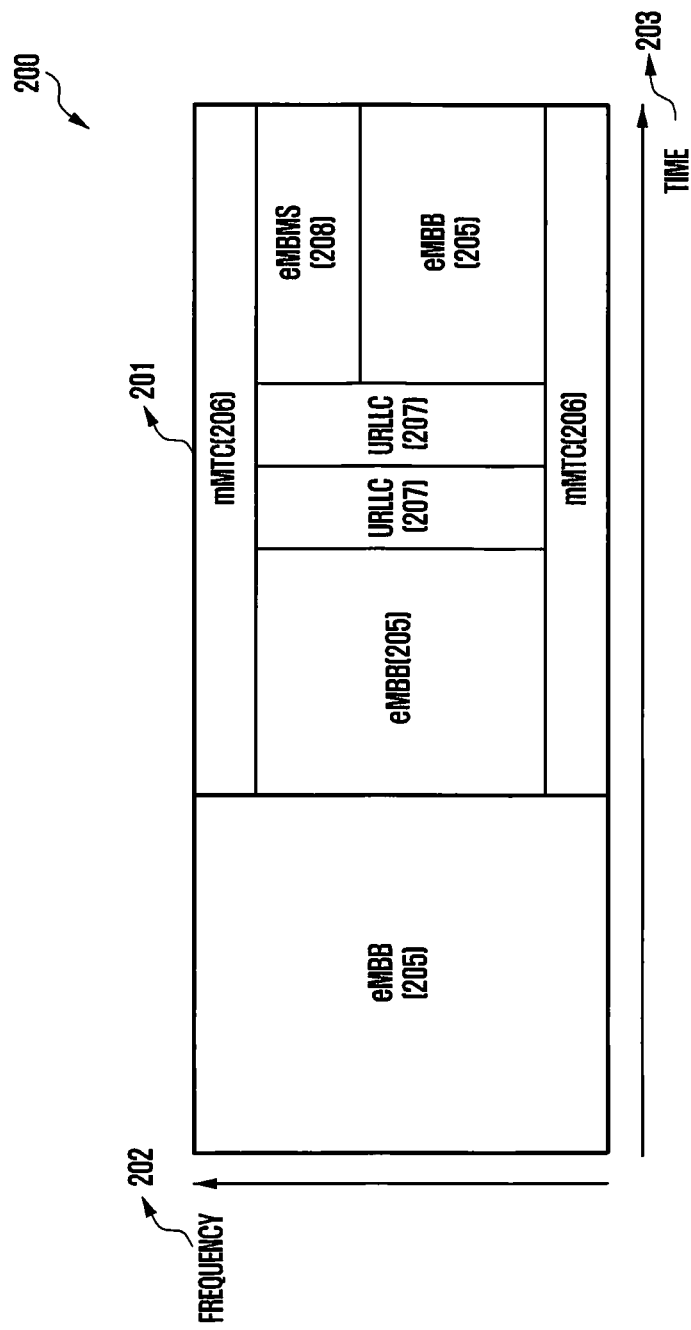
FIG. 2 illustrates an example in which 5G services are multiplexed in one system and transmitted.

FIG. 2 illustrates an example in which services considered in 5G are multiplexed in one system.

In FIG. 2, a frequency-time resource 201 used in 5G may be configured with a frequency axis 202 and a time axis 203. FIG. 2 illustrates that 5G operates an eMBB 205, an mMTC 206, and an URLLC 207 in a single framework. Further, as a service that is additionally considered in 5G, an enhanced mobile broadcast/multicast service (eMBMS) 208 for providing a cellular-based broadcast service may be considered. Services considered in 5G, such as the eMBB 205, the mMTC 206, the URLLC 207, the eMBMS 208, and the like, may be multiplexed via time-division multiplexing (TDM) or frequency-division multiplexing (FDM) in a single system frequency bandwidth that 5G operates and transmitted, and spatial division multiplexing may also be considered. The eMBB 205 may occupy the maximum frequency bandwidth at a specific predetermined time and transmitted, in order to provide the increased data transmission speed described above. Therefore, in the case of the eMBB 205 service, the eMBB 205 may be transmitted after being TDMed with another service within a system transmission bandwidth 201. However, according to needs of other services, the eMBB 205 may be transmitted after being FDMed with other services within the system transmission bandwidth.

In the case of the mMTC 206, unlike other services, an increased transmission interval is required in order to secure a wide coverage. Coverage may be secured by repeatedly transmitting the same packet within a transmission interval. At the same time, in order to reduce the complexity of a terminal and the price of the terminal, the transmission bandwidth within which the terminal is capable of performing reception may be limited. By taking into consideration the above-described requirements, the mMTC 206 may be frequency-division multiplexed with other services and transmitted within the transmission system bandwidth 201 of 5G.

The URLLC 207 may have a transmit time interval (TTI) shorter than those of other services in order to realize the ultra-low-latency requirement that the service requires. At the same time, since a low coding rate is needed in order to satisfy the ultra-high-reliability requirement, the URLLC 207 may have a wide frequency bandwidth. By taking into consideration the above-described requirements, the URLLC 207 may be time-division multiplexed with other services within the transmission system bandwidth 201 of 5G.

The above-described services may have different transmission/reception schemes and transmission/reception parameters in order to satisfy the requirements of each service. For example, each service may have a different numerology for each service requirement. Here, the numerology may include a cyclic prefix (CP) length, a subcarrier spacing, an OFDM symbol length, a transmit time interval (TTI), and the like in a communication system based on orthogonal frequency-division multiplexing (OFDM) or orthogonal frequency-division multiple access (OFDMA). For example, the services may have different numerologies, and the eMBMS 208 may have a CP length longer than that of other services. The eMBMS may transmit broadcast-based higher layer traffic, and thus may transmit the same data in all cells. Here, from the perspective of a terminal, if signals received in a plurality of cells are received within a CP length, the terminal may receive and decode all of the signals. Accordingly, the terminal may obtain a single frequency network (SFN) diversity gain, and even if the terminal is located at a cell boundary, the terminal may receive broadcasting information without coverage restraint. However, in the case where 5G supports eMBMS, if the CP length is longer than those of other services, waste due to CP overhead may occur. Accordingly, an OFDM symbol length longer than that of other services is required, and at the same time, a subcarrier spacing narrower than those of other services may be required.

Further, as an example in which different numerologies are used between services in 5G, in the case of URLLC, a shorter OFDM symbol length may be required as a smaller TTI is required than other services, and at the same time, a wider subcarrier interval may be required.

On the other hand, unlike the current LTE, which mainly uses a frequency band of 2 GHz, in 5G, a frequency of 20 MHz or higher is used in a frequency band equal to or lower than 6 GHz (hereinafter referred to as sub-6 GHz) or a frequency band equal to or higher than 6 GHz (hereinafter referred to as over-6 GHz), and thus may satisfy the data transmission speed demanded by 5G. As a scenario for 5G, the case where 5G operates with LTE of sub-6 GHz via dual connectivity (DC) in a non-standalone (NSA) mode and the case where NR operates in a standalone (SA) mode are being considered. In the case of 5G non-standalone mode, in which 5G and LTE operate in DC, simultaneous uplink transmission by a terminal through uplink carriers of LTE and 5G causes an interference problem due to harmonics and inter-modulation products, and thus increases difficulty in implementation of a terminal.

Further, in the case where LTE uplink transmission and 5G uplink transmission at one uplink frequency are configured for a terminal, simultaneously performing of uplink transmission may cause an interference problem due to harmonics and inter-modulation products. In addition, in the case where uplink transmission and downlink reception at different frequencies are configured for a terminal, harmonics and inter-modulation products of uplink transmissions at different specific frequencies may cause self-interference in downlink reception of the terminal.

Accordingly, the disclosure relates to performing uplink transmission through one uplink carrier at a given time in the case where LTE and NR uplink carriers are configured for the terminal. In particular, in the case where different timing advance (TA) values are applied in LTE transmission or NR transmission regardless of whether or not LTE transmission and NR transmission are in synchronization, a method and an apparatus for performing only one uplink transmission at a time in consideration of the TA values are provided.

Hereinafter, exemplary embodiments of the disclosure will be described in detail with reference to the accompanying drawings. Here, it is noted that identical reference numerals denote the same structural elements in the accompanying drawings. Further, a detailed description of known functions and configuration which may make the subject matter of the disclosure unclear will be omitted.

Further, although the following detailed description of embodiments of the disclosure will be directed to the 3GPP LTE standard, it can be understood by those skilled in the art that the main gist of the disclosure may also be applied to any other communication system having similar technical backgrounds and channel formats, with a slight modification, without substantially departing from the scope of the disclosure.

Hereinafter, a coexistence system in which an LTE cell and a 5G cell coexist and are connected via dual connectivity (DC) or carrier aggregation (CA), or a coexistence system in which an LTE cell and a 5G cell operate separately in a standalone mode, will be described.

FIGS. 3A to 3C, FIGS. 4A to 4C, and FIGS. 5A to 5C illustrate a first communication system 300, a second communication system 400, and a third communication system 500 to which the disclosure is applied, respectively. The drawings illustrate examples in which an LTE system and a 5G system, which are two different systems, coexist. Methods proposed by the disclosure are applicable to all of the system of FIGS. 3A to 3C, the system of FIGS. 4A to 4C, and the system of FIGS. 5A to 5C.

Referring to FIGS. 3A to 3C, FIG. 3A illustrates the case in which an LTE cell 302 and a 5G cell 303 coexist in a single base station 301 in a network. A terminal 304 may be an LTE-capable terminal having an LTE transmission/reception module, may be a 5G-capable terminal having a 5G transmission/reception module, or may be a terminal having both an LTE transmission/reception module and a 5G transmission/reception module. The terminal 304 may acquire synchronization using a synchronization signal transmitted from the LTE cell 302 or the 5G cell 303, and may transmit or receive data to or from the base station 301 via the LTE cell 302 or the 5G cell 303 after receiving system information. Here, the duplexing scheme of the LTE cell 302 or the 5G cell 303 is not limited. In the case where the LTE cell is a PCell, uplink control transmission is performed via the LTE cell 302, and in the case where the 5G cell is a PCell, uplink control transmission is performed via the 5G cell 303. Alternatively, a base station 301 may cause a terminal 304 to perform uplink transmission via one cell (or uplink carrier) among the LTE cell 302 and the 5G cell 303 at one time.

The terminal 304 may receive, from the base station, information indicating the cell (or uplink carrier) via which uplink transmission is to be performed among the LTE cell 302 and the 5G cell 303, and may perform the uplink transmission in a cell determined based on the received information. The information may be explicitly transmitted through a higher layer signal or a downlink physical control signal, and may be implicitly determined, on the basis of a cell of a base station (or downlink carrier) to which downlink data scheduling is transmitted, as the cell (or uplink carrier that is SIB-linked to the downlink carrier).

In the system of FIGS. 3A to 3C, an LTE cell and a 5G cell may include a plurality of serving cells, and may support a total of 32 serving cells. It is assumed that the base station 301 in the network includes both an LTE transmission/reception module (system) and a 5G transmission/reception module (system), and that the base station 301 is capable of managing and operating the LTE system and the 5G system in real time. If the LTE system and the 5G system are operated at different times, that is, through different temporal resources, the base station 301 is capable of dynamically selecting allocation of time resources to the LTE system and the 5G system. The terminal 304 may receive, from the LTE cell 302 or the 5G cell 303, a signal indicating allocation of resources (time resources, frequency resources, antenna resources, spatial resources, or the like) that the LTE cell and the 5G cell use in a divided manner, and thus may recognize the resource via which the data reception from the LTE cell 302 and the 5G cell 303 is performed.

Next, referring to FIG. 3B, a procedure in which the base station 301 configures a 5G resource and performs data transmission to or reception from the terminal 304 in the resource for 5G will be described.

In operation 310 of FIG. 3B, the base station 301 transmits an LTE or 5G resource allocation signal to the terminal 304. The signal may be a higher layer signal or may be a physical signal. The LTE or 5G resource allocation signal is information indicating where an LTE or 5G resource is located, and may include frequency information (a carrier frequency, a physical resource block, or the like), time information (a radio frame index, a subframe index, multimedia broadcast multicast service single-frequency network (MBSFN) subframe information for 5G transmission, uplink subframe information for 5G transmission, information on a blank resource or a reserved resource which is determined not to be used by 5G terminals for 5G transmission, information indicating whether a 5G signal included in the reserved resource or the blank resource is punctured in the case where rate matching is performed), antenna information, spatial information, duplexing information (FDD DL/UL carrier information, TDD UL/DL configuration information, or LAA-operation-related information), a signal by which a terminal acquires, in real time, whether an LTE/5G resource is occupied based on transmission of a reference signal or a synchronization signal, or the like.

Further, the 5G resource allocation signal may include information indicating whether a 5G resource is an LTE uplink subframe or an LTE MBSFN subframe. In addition, the 5G resource allocation signal may include information indicating whether a 5G resource starts from a first OFDM symbol, a second OFDM symbol, or a third OFDM symbol. In addition, the 5G resource allocation signal may include offset information indicating the location where a 5G resource starts in each subframe or each slot, or a period and an offset indicating locations of frequency and time resources for discovery of a 5G downlink control channel. In addition, the 5G resource allocation signal may include information indicating whether 5G transmission is performed over 12 OFDM symbols, 13 OFDM symbols, or 14 OFDM symbols. In addition, the 5G resource allocation signal may include information necessary for performing uplink transmission via one cell (or uplink carrier) among the LTE cell and the 5G cell. For example, the information may include an uplink transmission pattern indicating the cell in each slot or a mini-slot to which uplink transmission is performed, or information on a timing advance (TA) value for each cell. Synchronization information in the LTE system may be additionally acquired by the terminal 304, and may be transmitted by the base station 301.

In operation 311, the base station 301 transmits synchronization and system information for 5G to the terminal 304. As a synchronization signal for 5G, separate synchronization signals may be transmitted for eMBB, mMTC, and URLLC, which use different numerologies, and a common synchronization signal may be transmitted to a specific 5G resource using one numerology. The system information may be a common system signal transmitted via a specific 5G resource using one numerology, or may be separate system information transmitted for each of eMBB, mMTC, and URLLC, which use different numerologies.

In operation 312, the base station 301 may transmit or receive data for 5G service to or from the terminal 304 in a 5G resource. At this time, the base station 301 may receive uplink transmission from the terminal 304 via one cell (or uplink carrier).

Next, referring to FIG. 3C, a procedure in which the terminal 304 receives configuration of a 5G resource from the base station 301 and data transmission or reception is performed in the 5G resource will be described.

In operation 320 of FIG. 3C, the 5G-capable terminal 304 may receive an LTE or 5G resource allocation signal from the base station 301. The signal may be a higher layer signal, or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource or reserved resource which is determined not to be used by 5G terminals for 5G transmission, or information indicating whether a 5G signal included in the reserved resource or the blank resource is punctured in the case where rate matching is performed), antenna information, spatial information, duplexing information (FDD DL/UL carrier information, TDD UL/DL configuration information, or LAA-operation-related information), a signal by which a terminal acquires, in real time, whether an LTE/5G resource is occupied based on transmission of a reference signal or a synchronization signal, or the like.

In addition, the 5G resource allocation signal may include information indicating whether a 5G resource is an LTE uplink subframe or an LTE MBSFN subframe. In addition, the 5G resource allocation signal may include information indicating whether a 5G resource starts from a first OFDM symbol, a second OFDM symbol, or a third OFDM symbol. In addition, the 5G resource allocation signal may include offset information indicating the location where a 5G resource starts in each subframe or each slot, or a period and an offset indicating locations of frequency and time resources for discovery of a 5G downlink control channel. In addition, the 5G resource allocation signal may include information indicating whether 5G transmission is performed over 12 OFDM symbols, 13 OFDM symbols, or 14 OFDM symbols. In addition, the 5G resource allocation signal may include information necessary for performing uplink transmission via one cell (or uplink carrier) among the LTE cell and the 5G cell. For example, the information may include an uplink transmission pattern indicating the cell in each slot or a mini-slot to which uplink transmission is performed, or information on a timing advance (TA) value for each cell. Synchronization information in the LTE system may be additionally acquired by the 5G-capable terminal, and may be transmitted by the base station 301.

In operation 321, the terminal 304 acquires synchronization using a synchronization signal for 5G transmitted by the base station 301, and receives the system information transmitted by the base station 301. The synchronization signal for 5G may include separate synchronization signals for eMBB, mMTC, and URLLC, which use different numerologies, and a common synchronization signal transmitted to a specific 5G resource using one numerology. The system information may be a common system signal received in a specific 5G resource using one numerology, or may be separate system information received for each of eMBB, mMTC, and URLLC, which use different numerologies.

In operation 322, the terminal 304 may transmit or receive data for 5G service to or from the base station 301 in the 5G resource. At this time, the terminal 304 may perform uplink transmission to the base station 301 via one cell (or uplink carrier).

Referring to FIGS. 4A to 4C, FIG. 4A illustrates an example in which an LTE macro base station 401 for wide coverage and a 5G small base station 402 for increasing the amount of data transmission, are installed in a network. A terminal 404 may be an LTE-capable terminal having an LTE transmission/reception module, may be a 5G-capable terminal having a 5G transmission/reception module, or may be a terminal having both an LTE transmission/reception module and a 5G transmission/reception module. The terminal 404 may acquire synchronization using a synchronization signal transmitted from the LTE base station 401 or the 5G base station 402, and may perform data transmission/reception via the LTE base station 401 or the 5G base station 402 after receiving system information. Here, the duplexing scheme of the LTE macro base station 401 or the 5G small base station 402 is not limited.

Uplink control transmission is performed through an LTE cell 401 when the LTE cell is a Pcell, and is performed through a 5G cell 402 when the 5G cell is a Pcell. Alternatively, the LTE macro base station 401 or 5G small base station 402 may cause a terminal 404 to perform uplink transmission via a cell (or uplink carrier) of one base station among the LTE macro base station 401 and the 5G small base station 402 at one time. The terminal 404 may receive, from the LTE macro base station 401 or 5G small base station 402, information indicating the cell (or uplink carrier) of a base station via which uplink transmission is to be performed among the LTE macro base station 401 and the 5G small base station 402, and may perform the uplink transmission in a cell determined based on the received information. The information may be explicitly transmitted through a higher layer signal or a downlink physical control signal, and may be implicitly determined, on the basis of a cell of a base station (or downlink carrier) to which downlink data scheduling is transmitted, as the cell (or an uplink carrier which is SIB-linked to the downlink carrier).

Here, it is assumed that the LTE base station 401 and the 5G base station 402 have an ideal backhaul network or a non-ideal backhaul network. Therefore, in the case where the LTE base station 401 and the 5G base station 402 have an ideal backhaul network 403, fast inter-base station X2 communication 403 is possible, and even if uplink transmission is transmitted only to the LTE base station 401, the 5G base station 402 is capable of receiving related control information from the LTE base station 401, in real time, via the X2 communication 403.

In the system of FIGS. 4A to 4C, an LTE cell and a 5G cell may include a plurality of serving cells, and may support a total of 32 serving cells. The base station 401 or 402 is capable of managing and operating the LTE system and the 5G system in real time. If the base station 401 operates the LTE system and the 5G system at different times, that is, through different temporal resources, the base station 401 is capable of dynamically selecting allocation of time resources (uplink time resources, uplink frequency resources, antenna resources, spatial resources, downlink time resources, downlink frequency resources, or the like) to the LTE system and the 5G system, and is capable of transmitting a corresponding signal to another base station 402 via an X2 interface. The terminal 404 may receive, from the LTE base station 401 or the 5G base station 402, a signal indicating allocation of resources (uplink time resources, uplink frequency resources, antenna resources, spatial resources, downlink time resources, downlink frequency resources, or the like) that the LTE cell and the 5G cell dividedly operate, and thus may recognize the resource via which the data transmission or reception from the LTE cell 401 and the 5G cell 402 is performed.

On the other hand, if the LTE base station 401 and 5G base station 402 have a non-ideal backhaul network 403, fast inter-base station X2 communication 403 is not possible. Accordingly, the base station 401 or 402 is capable of semi-statically operating the LTE system and the 5G system. For example, if the base station 401 operates the LTE system and the 5G system at different times, that is, through different temporal resources, the base station 401 is capable of selecting allocation of time resources (uplink time resources, uplink frequency resources, antenna resources, spatial resources, downlink time resources, downlink frequency resources, etc.) to the LTE system and the 5G system, and transmitting a corresponding signal to another base station 402 in advance via an X2 interface, thereby separately using resources for the LTE system and the 5G system. The terminal 404 may receive, from the LTE base station 401 or the 5G base station 402, a signal indicating allocation of resources (uplink time resources, uplink frequency resources, antenna resources, spatial resources, downlink time resources, downlink frequency resources, etc.) that the LTE cell and the 5G cell dividedly operate, and thus may recognize the resource via which data transmission or reception from the LTE cell 401 and the 5G cell 402 is performed.

Next, referring to FIG. 4B, a procedure in which the base station 401 or 402 configures a 5G resource and performs data transmission or reception to or from the terminal 404 in the resource for 5G will be described.

In operation 410 of FIG. 4B, the base station 401 transmits an LTE or 5G resource allocation signal to the 5G base station 402 via an X2 interface 403, and transmits the LTE or 5G resource allocation signal to a terminal. In the case where the LTE system and the 5G system are operated in different resources by dividing resources, the base station 401 may select allocation of time resources of the LTE system and the 5G system, and may transmit the allocation information to another base station 402 via the X2 interface so as to distinguish the resources for the LTE system from those for the 5G system. In the case where an LTE or 5G resource allocation signal is transmitted to the 5G-capable terminal 404, the signal may be a higher layer signal or a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource or a reserved resource which is determined not to be used by 5G terminals for 5G transmission, information indicating whether a 5G signal included in the reserved resource or the blank resource is punctured in the case where rate matching is performed), antenna information, spatial information, duplexing information (FDD DL/UL carrier information, TDD UL/DL configuration information, or LAA-operation-related information), a signal by which a terminal acquires, in real time, whether an LTE/5G resource is occupied based on transmission of a reference signal or a synchronization signal, or the like.

Further, the 5G resource allocation signal may include information indicating whether a 5G resource is an LTE uplink subframe or an LTE MBSFN subframe. In addition, the 5G resource allocation signal may include information indicating whether a 5G resource starts from a first OFDM symbol, a second OFDM symbol, or a third OFDM symbol. In addition, the 5G resource allocation signal may include offset information indicating the location where a 5G resource starts in each subframe or each slot, or a period and an offset indicating locations of frequency and time resources for discovery of a 5G downlink control channel. In addition, the 5G resource allocation signal may include information indicating whether 5G transmission is performed over 12 OFDM symbols, 13 OFDM symbols, or 14 OFDM symbols. In addition, the 5G resource allocation signal may include information necessary for performing uplink transmission via one cell (or uplink carrier) among the LTE cell and the 5G cell. For example, the information may include an uplink transmission pattern indicating the cell in each slot or a mini-slot to which uplink transmission is performed, or information on a TA value for each cell. Synchronization information in the LTE system may be additionally acquired by the terminal 404 and may be transmitted by the base station 401 or 402.

In operation 411, the base station 401 or 402 transmits synchronization and system information for 5G to the terminal 404. The synchronization signal for 5G may include separate synchronization signals for eMBB, mMTC, and URLLC, which use different numerologies, and a common synchronization signal transmitted to a specific 5G resource using one numerology. The system information may be a common system signal transmitted to a specific 5G resource using one numerology, or may be separate system information transmitted for each of the eMBB, mMTC, and URLLC, which use different numerologies.

In operation 412, the base station 401 or 402 may transmit or receive data for 5G service to or from the terminal 404 in the 5G resource. At this time, only one base station among the base stations 401 and 402 may receive uplink transmission from the terminal 404 at one time.

Next, referring to FIG. 4C, a procedure in which the terminal 404 receives configuration of a 5G resource from the base station 401 or 402 and data transmission or reception is performed in the 5G resource will be described.

In operation 420 of FIG. 4C, the terminal 404 may receive an LTE or 5G resource allocation signal from the base station 401 or 402. The signal may be a higher layer signal, or a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource or reserved resource which is determined not to be used by 5G terminals for 5G transmission, or information indicating whether a 5G signal included in the reserved resource or the blank resource is punctured in the case where rate matching is performed), antenna information, spatial information, duplexing information (FDD DL/UL carrier information, TDD UL/DL configuration information, or LAA-operation-related information), a signal by which a terminal acquires, in real time, whether an LTE/5G resource is occupied based on transmission of a reference signal or a synchronization signal, or the like.

In addition, the 5G resource allocation signal may include information indicating whether a 5G resource is an LTE uplink subframe or an LTE MBSFN, subframe. In addition, the 5G resource allocation signal may include information indicating whether a 5G resource starts from a first OFDM symbol, a second OFDM symbol, or a third OFDM symbol. In addition, the 5G resource allocation signal may include offset information indicating the location at which a 5G resource starts in each subframe or each slot, or a period and an offset indicating locations of frequency and time resources for discovery of a 5G downlink control channel. In addition, the 5G resource allocation signal may include information indicating whether 5G transmission is performed over 12 OFDM symbols, 13 OFDM symbols, or 14 OFDM symbols. In addition, the 5G resource allocation signal may include information necessary for performing uplink transmission via one cell (or uplink carrier) among the LTE cell and the 5G cell. For example, the information may include an uplink transmission pattern indicating the cell in each slot or a mini-slot to which uplink transmission is performed, or information on a TA value for each cell. Synchronization information in the LTE system may be additionally acquired by the 5G-capable terminal, and may be transmitted by the base station 401 or 402.

In operation 421, the terminal 404 acquires synchronization from a synchronization signal for 5G transmitted by the base station 401 or 402, and receives the system information transmitted by the base station 401 or 402. The synchronization signal for 5G may include separate synchronization signals for eMBB, mMTC, and URLLC, which use different numerologies, and a common synchronization signal transmitted to a specific 5G resource using one numerology. The system information may be a common system signal transmitted to a specific 5G resource using one numerology, or may be separate system information received for each of eMBB, mMTC, and URLLC, which use different numerologies.

In operation 422, the terminal 404 may transmit or receive data for 5G service to or from the base station 401 or 402 in the 5G resource. At this time, the terminal 404 may perform uplink transmission to the base station 401 or 402 via one cell (or uplink carrier).

Referring to FIGS. 5A to 5C, FIG. 5A illustrates an LTE base station 501 and a 5G base station 504, which are separately installed. In this case, there is no restriction on the duplex scheme of the LTE base station 501 or the 5G base station 504. Each of the LTE base station 501 or the 5G base station 504 is in a stand-alone mode, and a terminal may camp to each base station. An LTE-capable terminal 503 including an LTE transmission/reception module may camp on the LTE base station 501, and the LTE-capable terminal 503 may acquire synchronization using a synchronization signal transmitted from the LTE base station 501, acquires system information, and then perform data transmission or reception to or from the LTE base station 501 (indicated by reference numeral 502). A 5G-capable terminal 506 including a 5G transmission/reception module may camp on the 5G base station 504, and the 5G-capable terminal 506 may acquire synchronization through a synchronization signal transmitted from the 5G base station 504, receive system information, and then perform data transmission or reception to or from the 5G base station 504 (indicated by reference numeral 505).

In the case where there is an integrated controller 507 that controls the LTE base station 501 and the 5G base station 504, the integrated controller 507 may manage and operate the LTE base station 501 and the 5G base station 504 in real time. If the integrated controller 507 operates the LTE system and the 5G system at different times, that is, through different temporal resources, the integrated controller 507 may dynamically select allocation of time resources to the LTE system and the 5G system, and may transmit a corresponding signal to the LTE base station 501 and the 5G base station 504.

The LTE-capable terminal 503 may receive a signal indicating the resource via which an LTE signal is to be transmitted or received by the LTE base station 501, and may recognize the resource via which data is transmitted or received by the LTE base station. The 5G-capable terminal 506 receives a signal indicating a resource (uplink time resources, uplink frequency resources, antenna resources, spatial resources, downlink time resources, downlink frequency resources, or the like), via which a 5G signal is to be transmitted or received by the 5G base station 504, and may recognize a resource via which data is transmitted or received by the 5G base station.

In the case where no integrated controller 507 exists, a base station procedure and a terminal procedure of FIGS. 4A to 4C are basically followed. In the case where a non-ideal backhaul exists, fast inter-base-station X2 communication is not possible. Therefore, the base station 501 or 504 may semi-statically operate the LTE system and the 5G system. For example, in the case where the base station 501 or 504 operates the LTE system and the 5G system at different times, that is, through different temporal resources, the base station 501 or 504 may select allocation of time resources to the LTE system and the 5G system, and may transmit, in advance, a corresponding signal to another base station 504 or 501 via an X2 interface, thereby separately using resources for the LTE system and the 5G system.

The LTE-capable terminal 503 may receive a signal indicating a resource via which an LTE signal is to be transmitted or received by the LTE base station 501, and may recognize a resource via which data is transmitted or received by the LTE base station. The 5G-capable terminal 506 may receive a signal indicating a resource (uplink time resources, uplink frequency resources, antenna resources, spatial resources, downlink time resources, downlink frequency resources or the like) via which a 5G signal is to be transmitted or received by the 5G base station 504, and may recognize a resource via which data is transmitted or received by the 5G base station.

Next, referring to FIG. 5B, a procedure in which the base station 504 configures a 5G resource and performs data transmission or reception to or from the 5G-capable terminal 506 in the resource for 5G will be described.

In operation 510 of FIG. 5B, the base station 504 transmits synchronization and system information for 5G to the 5G-capable terminal 506 in the resource configured for 5G transmission. The synchronization signal for 5G may be a different synchronization signal for each of eMBB, mMTC, and URLLC, which use different numerologies, or may be a common synchronization signal transmitted via a specific 5G resource using one numerology. The system information may be a common system signal transmitted via a specific 5G resource using one numerology, or may be separate system information for each of eMBB, mMTC, and URLLC, which use different numerologies.

In operation 511, the 5G base station 504 may transmit an LTE or 5G resource allocation signal to the terminal 506. In the case where an LTE or 5G resource allocation signal is transmitted to the 5G-capable terminal 506, the signal may be a higher layer signal or may be a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource or a reserved resource which is determined not to be used by 5G terminals for 5G transmission, information indicating whether a 5G signal included in the reserved resource or the blank resource is punctured when rate matching is performed, or the like), antenna information, spatial information, duplexing information (FDD DL/UL carrier information, TDD UL/DL configuration information, LAA-operation-related information), a signal used for a terminal to acquire, in real time, whether an LTE/5G resource is occupied by transmission of a reference signal or a synchronization signal, or the like.

Further, the 5G resource allocation signal may include information indicating whether a 5G resource is an LTE uplink subframe or an LTE MBSFN subframe. Still further, the 5G resource allocation signal may include information indicating whether a 5G resource starts from a first OFDM symbol, a second OFDM symbol, or a third OFDM symbol. In addition, the 5G resource allocation signal may include offset information indicating the location where a 5G resource starts in each subframe or each slot or a period and an offset indicating locations of frequency and time resources for discovery of a 5G downlink control channel. In addition, the 5G resource allocation signal may include information indicating whether 5G transmission is performed over 12 OFDM symbols, 13 OFDM symbols, or 14 OFDM symbols. In addition, the 5G resource allocation signal may include information necessary for performing uplink transmission via one cell (or uplink carrier) among the LTE cell and the 5G cell. For example, the information may include an uplink transmission pattern indicating the cell in each slot or a mini-slot to which uplink transmission is performed, or information on a timing advance (TA) value for each cell. Synchronization information in the LTE system may be additionally acquired by the 5G-capable terminal, and may be transmitted by the base station 501.

In the case where an integrated controller 507 exists, LTE or 5G resource allocation is determined by the integrated controller 507 and transmitted to the 5G base station 504 via an X2 interface. Therefore, in the case where the LTE system and the 5G system are operated in different resources by dividing resources, the integrated controller 507 may select resource allocation to the LTE system and the 5G system and may transmit allocation information to the base station 501 or 504 via an X2 interface so as to distinguish the resources for the LTE system from those for the 5G system. In the case where no integrated controller 507 exists, as shown in the base station procedure of FIGS. 4A to 4C, the LTE base station or the 5G base station may select LTE or 5G resource allocation and transmit the same to another base station.

In operation 512, the base station 504 may perform data transmission or reception for a 5G service to or from the 5G-capable terminal 506 in the 5G resource. At this time, the base station 504 may receive, from the 5G-capable terminal 506, uplink transmission via one cell (or uplink carrier) at one time.

Next, referring to FIG. 5C, a procedure is described in which the 5G-capable terminal 506 receives configuration of a 5G resource from the base station 504, and the 5G-capable terminal 506 performs data transmission or reception in the 5G resource.

In operation 520 of FIG. 5C, the 5G-capable terminal 506 acquires synchronization from a synchronization signal for 5G, which is transmitted by the base station 504 in the resource configured for 5G transmission, and receives system information transmitted by the base station 504. The synchronization signal for 5G may be a separate synchronization signal for each of eMBB, mMTC, and URLLC, which use different numerologies, or may be a common synchronization signal transmitted to a specific 5G resource using one numerology. The system information may be a common system signal received via a specific 5G resource using one numerology, or may be separate system information for each of eMBB, mMTC, and URLLC, which use different numerologies.

In operation 521, the 5G-capable terminal 506 may receive an LTE or 5G resource allocation signal from the base station 504. The signal may be a higher layer signal or a physical signal. The LTE or 5G resource allocation signal is information indicating where an LTE or 5G resource is located, and may include frequency information (a carrier frequency, a physical resource block, or the like), time information (a radio frame index, a subframe index, MBSFN subframe information for 5G transmission, uplink subframe information for 5G transmission, information on a blank resource or a reserved resource which is determined not to be used by 5G terminals for 5G transmission, information indicating whether a 5G signal included in the reserved resource or the blank resource is punctured when rate matching is performed), antenna information, spatial information, duplexing information (FDD DL/UL carrier information, TDD UL/DL configuration information, or LAA-operation-related information), a signal by which a terminal acquires, in real time, whether an LTE/5G resource is occupied based on transmission of a reference signal or a synchronization signal, or the like.

Further, the 5G resource allocation signal may include information indicating whether a 5G resource is an LTE uplink subframe or an LTE MBSFN subframe. Still further, the 5G resource allocation signal may include information indicating whether a 5G resource starts from a first OFDM symbol, a second OFDM symbol, or a third OFDM symbol. In addition, the 5G resource allocation signal may include offset information indicating the location where a 5G resource starts in each subframe or each slot, or a period and an offset indicating locations of frequency and time resources for discovery of a 5G downlink control channel. In addition, the 5G resource allocation signal may include information indicating whether 5G transmission is performed over 12 OFDM symbols, 13 OFDM symbols, or 14 OFDM symbols. In addition, the 5G resource allocation signal may include information necessary for performing uplink transmission via one cell (or uplink carrier) among the LTE cell and the 5G cell. For example, the information may include an uplink transmission pattern indicating the cell in each slot or a mini-slot to which uplink transmission is performed, or information on a timing advance (TA) value for each cell. Synchronization information in the LTE system may be additionally acquired by the 5G-capable terminal, and may be transmitted by the base station 501.

In operation 522, the 5G-capable terminal 506 may perform data transmission or reception for a 5G service to or from the base station 504 in the 5G resource. At this time, the 5G-capable terminal 506 may perform uplink transmission to the base station 504 via one cell (or uplink carrier).

Next, a description will be given of the operation of a terminal in the case where uplink transmission is configured for or indicated to a terminal at a plurality of uplink frequencies in the situation where the LTE system and the 5G system of FIGS. 3A to 3C, FIGS. 4A to 4C, and FIGS. 5A to 5C coexist. In a 5G non-standalone mode in which 5G and LTE operate via dual connectivity (DC), simultaneously performing uplink transmission through uplink carriers of LTE and 5G by the terminal causes a problem of harmonics and an interference problem due to inter-modulation products, thereby increasing the difficulty of implementation of the terminal. In addition, in the case where LTE uplink transmission and 5G uplink transmission at one uplink frequency are configured for the terminal, simultaneously performing uplink transmission may cause interference problems in LTE downlink reception or NR downlink reception due to harmonics and inter-modulation products. A method for performing uplink transmission through only one uplink frequency band at one time by considering a TA value according to each uplink frequency will be described with reference to FIG. 6.

Figure 5:
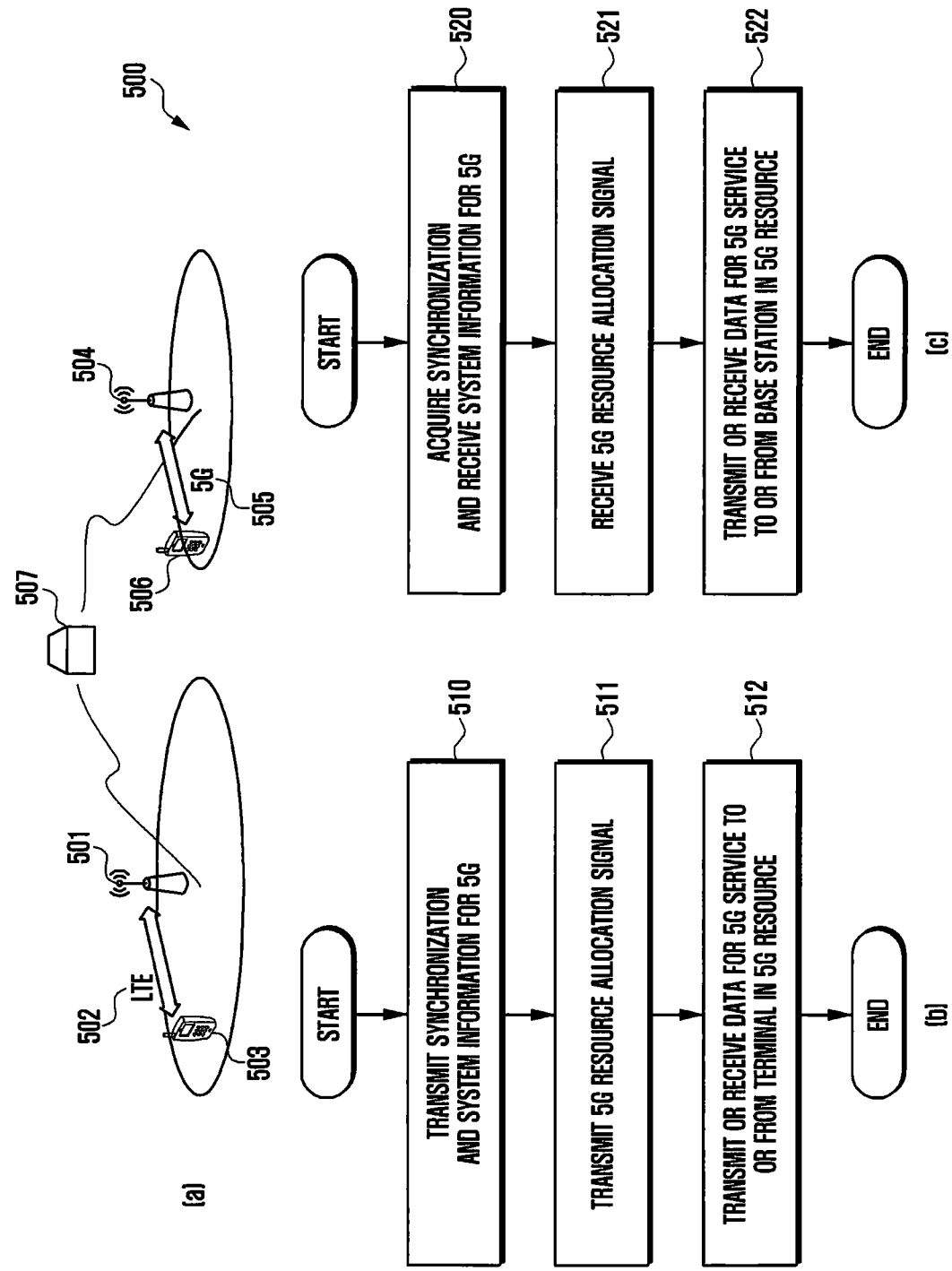
FIGS. 5A to 5C illustrate a third communication system to which the disclosure is applied.
Figure 6:
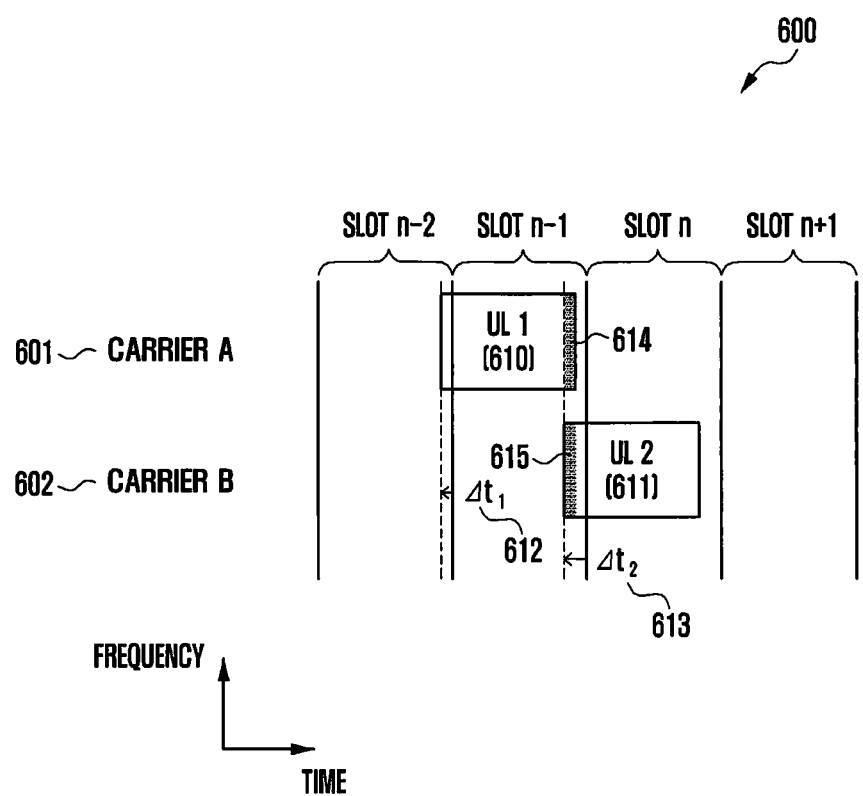
FIG. 6 illustrates an embodiment 1 proposed by the disclosure.

FIG. 6 illustrates an embodiment 1 600 proposed in the disclosure. In FIG. 6, it is assumed that carrier A 601 and carrier B 602, which are a plurality of uplink frequencies, are configured for a terminal through reception of a higher layer signal in the communication system of FIGS. 3A to 3C, FIGS. 4A to 4C, and FIGS. 5A to 5C. Further, FIG. 6 is based on a situation where, for uplink transmission through carrier A 601, the terminal configures TA1 612, as timing advance, through reception of a higher layer signal, and for uplink transmission through carrier B 602, the terminal configures TA2 613, as timing advance, through reception of the higher layer signal. In the drawing, the operation of the terminal according to the disclosure is described assuming that carrier A 601 and carrier B 602 are different carriers, but in the case where carrier A 601 and carrier B 602 are the same carrier, that is, even if there is a plurality of uplink transmissions through a single carrier, the operation of the terminal according to the disclosure can be applied.

In this case, uplink transmission 1 610 through carrier A 601 in slot n−1 is indicated to the terminal by the base station, and uplink transmission 2 611 through carrier B 602 in slot n is indicated to the terminal by the base station. The indication method may include scheduling by a downlink physical control signal and configuration by a higher layer signal. In the case of the scheduling or configuration, the terminal receives a higher layer signal or a downlink physical control channel from a base station and performs uplink transmission 1 610 or uplink transmission 2 611. Uplink transmission 1 610 or uplink transmission 2 611 may be an uplink data channel, an uplink control channel, an uplink reference signal, or the like.

In FIG. 6, with respect to uplink transmission 1 610 through carrier A 610 in slot n−1 and uplink transmission 2 611 through carrier B 611 in slot n, TA1 612 and TA2 613 may be different. Further, since uplink transmissions through carrier A 601 and carrier B 602 may not be synchronized, transmission areas of uplink transmission 1 610 and uplink transmission 2 611 may overlap in the time domain (indicated by reference numerals 614 and 615). Therefore, interference problems due to harmonics and inter-modulation products, generated in the case where two uplink transmissions overlap in the time domain, occur. Therefore, in this case, a method by which a terminal performs only one uplink transmission at one time is provided.

First, in the case where LTE transmission and 5G transmission are performed simultaneously, the terminal always prioritizes LTE transmission. That is, LTE transmission is completely performed without dropping symbols, and an overlapping portion or the entirety of a 5G transmission that temporally overlaps the LTE transmission is dropped. The terminal acquires LTE synchronization through a specific carrier and determines that the transmission or reception through the carrier is LTE transmission by performing LTE transmission or reception operation through a specific carrier through reception of system information according to the LTE standard, performing random access, RRC connection, transmission or reception of control/data channel/reference signal, and the like. In addition, the terminal acquires 5G synchronization through a specific carrier, and determines that the transmission or reception through the carrier is 5G transmission by performing 5G transmission or reception through a specific carrier through reception of system information according to 5G standard, performing of random access, RRC connection, transmission or reception of control/data channel/reference signal, and the like.

If uplink transmission 1 610 is LTE and uplink transmission 2 611 is 5G, the terminal performs uplink transmission 1 610 completely, and does not transmit a portion 615 of uplink transmission 2 611 that overlaps a portion 614 of uplink transmission 1 610 in the time domain, but transmits only the remaining portions of uplink transmission 2 611. Alternatively, if there is a portion 615 of uplink transmission 2 611, which overlaps the portion 614 in the time domain, the terminal drops uplink transmission 2 611. In the case where uplink transmission 2 611 is an uplink control channel, if only the remaining portion of uplink transmission 2 611 is transmitted, without transmitting the portion 615 of uplink transmission 2 611, the terminal may transmit a short PUCCH instead of a long PUCCH. Alternatively, the terminal may transmit the number of symbols of a long PUCCH, obtained by subtracting the number of symbols of the portion 615 from X1 and changing the number of symbols of the long PUCCH to X2, which is smaller than X1. For example, if X1 is 14 and the portion 615 is 2 symbols, X2 may be determined to be 12.

In the case where a 5G base station does not know the value of TA1 612, configured for a terminal by an LTE base station, the 5G base station assumes puncturing for the reception of uplink transmission 2 611 and decodes uplink transmission 2 611. That is, the 5G base station maps 0, as a reception value, to the portion 615 and performs decoding of uplink transmission 2 611. In the case where the 5G base station knows the value of TA1 612, configured for the terminal by the LTE base station, the 5G base station assumes rate mapping for reception of uplink transmission 2 611 and decodes the uplink transmission 2 611. That is, the 5G base station assumes that there is no portion 615 in uplink transmission 2 611, maps the uplink channel/reference signal using only the remaining portions, and performs decoding thereof. In this case, the terminal also assumes that there is no portion 615 in uplink transmission 2 611, needs to map the uplink channel/reference signal using only the remaining portions, and perform transmission thereof. The TA1 612 and the TA2 613 may be exchanged through a backhaul (X2 or Xn interface) between the LTE and 5G base stations, and the terminal may transmit TA1 612 configured by the LTE base station to the 5G base station via uplink control/data channel.

In the case where uplink transmission 1 610 is 5G and uplink transmission 2 611 is LTE, the terminal does not transmit the portion 614 of uplink transmission 1 610, which overlaps the portion 615 of uplink transmission 2 611 in the time domain when performing uplink transmission 1 610. Further, the terminal completely performs uplink transmission 2 611. Alternatively, if there is a portion 614 of uplink transmission 1 610 that overlaps the portion 615 in the time domain, the terminal drops uplink transmission 1 610. In the case where uplink transmission 1 610 is an uplink control channel, the terminal transmits the remaining portion of uplink transmission 1 610 without transmitting the portion 614 of uplink transmission 1 610, and the terminal may transmit a short PUCCH instead of the long PUCCH. Alternatively, the terminal may transmit the number of symbols of the long PUCCH, obtained by subtracting the number of symbols of the portion 614 from X1 and changing the number of symbols of the long PUCCH to X2, which is smaller than X1. For example, if X1 is 14 and the portion 614 is 2 symbols, X2 may be determined to be 12.

In the case where the 5G base station does not know the value of TA2 613, configured for the terminal by the LTE base station, the 5G base station assumes puncturing for the reception of uplink transmission 1 610 and decodes the same. That is, the 5G base station maps 0, as a reception value, to the portion 614, and decodes uplink transmission 1 610. If the 5G base station knows the value of TA2 613, configured for the terminal by the LTE base station, the 5G base station assumes rate mapping for the reception of uplink transmission 1 610 and decodes the same. That is, the 5G base station assumes that there is no portion 614 in uplink transmission 1 610, and needs to map an uplink channel/reference signal using only the remaining portions and decodes the same. In this case, the terminal also assumes that there is no portion 614 in uplink transmission 1 610, and needs to map an uplink channel/reference signal using only the remaining portions and perform transmission thereof. The TA1 612 and the TA2 613 may be exchanged through a backhaul (X2 or Xn interface) between the LTE and 5G base station, and the terminal may transmit the TA2 613 configured by the LTE base station to the 5G base station via the uplink control/data channel.

Secondly, in the case where 5G transmission and 5G transmission are performed at the same time, the terminal performs transmission based on a priority described below.

As the first method of determining the priority, if uplink transmission 1 610 is 5G and uplink transmission 2 611 is 5G, the terminal gives priority to the transmission that is transmitted earlier in time. That is, the terminal transmits uplink transmission 1 610 in its entirety, and does not transmit a portion 615 of uplink transmission 2 611, which overlaps a portion 614 of uplink transmission 1 610 in the time domain, but only transmits the remaining portions of uplink transmission 2 611.

The second method of determining the priority is to prioritize uplink transmission transmitted in a primary cell (Pcell). If uplink transmission 1 610 is an uplink transmission performed in the primary cell, and uplink transmission 2 611 is uplink transmission performed in a secondary cell (Scell), the terminal transmits uplink transmission 1 610 in its entirety, and transmits only the remaining portions of uplink transmission 2 611 without transmitting the portion 615 of uplink transmission 2 611, which overlaps the portion 614 of uplink transmission 1 610 in the time domain.

As the third method of determining the priority, the terminal determines which transmission is to be prioritized in an overlapping portion in view of the type of channel, the type of uplink control information (UCI), the payload size, and the like. That is, the terminal completely transmits uplink transmission having a high priority and does not transmit lower-priority uplink transmission that overlaps the uplink transmission having a high priority, and transmits only lower-priority uplink transmission that does not overlap the uplink transmission having a high priority. For example, in the case where uplink transmission 1 610 is an uplink data channel, uplink transmission 2 611 is an uplink control channel, and uplink transmission 1 610 and uplink transmission 2 611 temporally collide as shown in FIG. 6 (indicated by reference numerals 614 and 615), the terminal first transmits an uplink control channel of uplink transmission 2 611. That is, the terminal does not transmit the portion 614, which is a temporally overlapping portion of the uplink data channel of uplink transmission 1 610, and transmits only the remaining portions of uplink transmission 1 610. In addition, in the case where uplink transmission 1 610 is an uplink data channel including control information, uplink transmission 2 611 is an uplink data channel including only data information, and uplink transmission 1 610 and uplink transmission 2 611 temporally collide as shown in FIG. 6 (indicated by reference numerals 614 and 615), the terminal first transmits an uplink data channel including control information of uplink transmission 1 610. That is, the terminal does not transmit the portion 615, which is a portion overlapping the uplink data channel of uplink transmission 2 611, and transmits only the remaining portions of uplink transmission 2 611.

In addition, in the case where uplink transmission 1 610 is an uplink control channel including channel information, uplink transmission 2 611 is an uplink control channel including A/N transmission, and channel information transmission and A/N transmission of the uplink control channel temporally collide (indicated by reference numerals 614 and 615), the terminal first transmits A/N of uplink transmission 2 611. That is, the terminal does not transmit the portion 614, which is a portion temporally overlapping the A/N transmission in uplink transmission 1 610, and transmits only the remaining portions of uplink transmission 1 610. In addition, in the case where transmission of uplink control channel information having a large payload size and transmission of uplink control channel information having a relatively small payload size temporally collide, the terminal first performs transmission of the uplink control channel having a large payload size.

In another embodiment, in the case where the uplink transmission power of uplink transmission 1 610 is different from the uplink transmission power of uplink transmission 2 611, a guard interval for adjusting uplink transmission power is required, and in order to obtain the guard interval, the terminal completely transmits uplink transmission 1 610, and transmits only the remaining portions of uplink transmission 2 611 without transmitting the portion 615 of uplink transmission 2 611. Alternatively, in order to obtain the guard interval, the terminal transmits only the remaining portions of uplink transmission 1 610 without transmitting the portion 614 of uplink transmission 1 610, and completely transmits uplink transmission 2 611.

In another embodiment, in the 5G uplink transmission in which LTE transmission is needs to be always first dropped in the first method, or according to a waveform applied to uplink transmissions having lower priorities in the second method, only a non-overlapping portion may be transmitted while an overlapping portion is dropped, or the entire uplink transmission of the overlapping portion may be dropped.

For example, in the case where a portion of uplink transmission 2 611 temporally overlaps uplink transmission 1 610 and a portion or all of uplink transmission 2 needs to be dropped, and in the case where the waveform of uplink transmission 2 611 is a discrete Fourier transform spread OFDM (DFT-S-OFDM), the terminal transmits only the remaining portions of the uplink transmission 2 611 without transmitting the portion 615. If the waveform of uplink transmission 2 611 is cyclic-prefix-based OFDM (CP-OFDM), and in the case where the terminal has a portion 615 of uplink transmission 2 611 that temporally overlaps the portion 614, the terminal may drop the entire uplink transmission 2 611.

The reason that the operation of the terminal described above can be applied is as follows. In the case where time-priority mapping is applied if the uplink waveform is DFT-S-OFDM in uplink data transmission, a base station may decode uplink data because only some symbols of a codeword are not transmitted even if some OFDM symbols are dropped. However, in the case where frequency-priority mapping is applied if the uplink waveform is CP-OFDM, it is highly likely that the entire codeword is not transmitted when some OFDM symbols are dropped. Therefore, the base station may not decode the uplink data at this time. The uplink waveform may be determined according to the waveform indicated to the terminal by msg 2 in the case of performing random access, and may be indicated to the terminal by a higher layer signal or a physical signal. The terminal performs uplink transmission according to the indicated waveform.

Next, a description will be given of the operation of the terminal in the case where uplink transmission and downlink reception are configured or indicated for a terminal in a plurality of frequencies in the situation where the LTE system and the 5G system of FIGS. 3A to 3C, FIGS. 4A to 4C, and FIGS. 5A to 5C coexist.

In the case where uplink transmission and downlink reception are configured for a terminal at different frequencies, self-interference in downlink reception by the terminal may occur due to harmonics and inter-modulation products of uplink transmissions at different specific frequencies. Accordingly, in order to solve the self-interference problem of the downlink reception by the terminal, a method of performing only uplink or downlink transmission at one time by considering a TA value according to the uplink transmission will be described.

Figure 7:
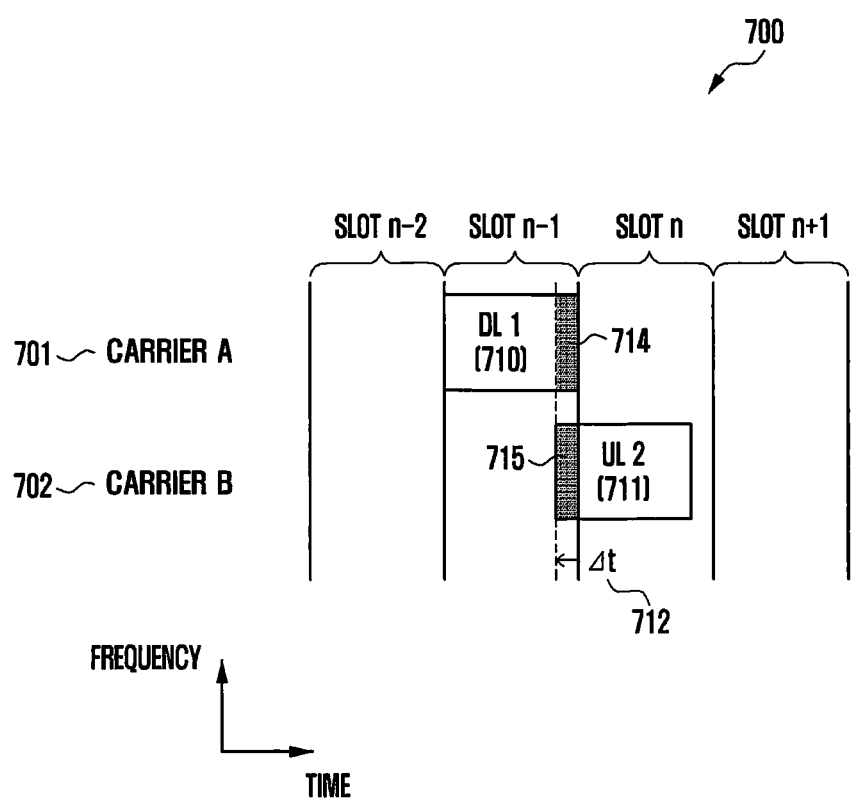
FIG. 7 illustrates an embodiment 2 proposed by the disclosure.

FIG. 7 illustrates an embodiment 2 700 proposed in the disclosure. In FIG. 7, it is assumed that carrier A 701 and carrier B 702, which are a plurality of frequencies, are configured for a terminal through reception of a higher layer signal in the communication system of FIGS. 3A to 3C, FIGS. 4A to 4C, and FIGS. 5A to 5C. In addition, it is assumed that the terminal performs downlink reception through carrier A 701, and for uplink transmission through carrier B 702, the terminal configures TA 712, as a timing advance, through the reception of a higher layer signal. In the drawing, the operation of the terminal according to the disclosure is described under the assumption that carrier A 701 and carrier B 702 are different carriers, but even in the case where carrier A 701 and carrier B 702 are the same one, that is, even in the case where downlink reception and uplink transmission are performed through a single carrier, the operation of the terminal according to the disclosure can be applied. In the above situation, it is assumed that a base station may configure a sufficient guard subcarrier in a frequency domain, and the base station has a transceiver device capable of simultaneously performing uplink and downlink transmission and reception.

In this case, the base station indicates downlink reception 1 710 through carrier A 701 in slot n−1 to the terminal, and indicates uplink transmission 2 711 through carrier B 702 in slot n to the terminal. The indication method may include scheduling by a downlink physical control signal and configuration by a higher layer signal. In the case of the scheduling or configuration, the terminal receives a higher layer signal or a downlink physical control channel from the base station so as to receive downlink transmission 1 710 or transmit uplink transmission 2 711. Downlink transmission 1 710 or uplink transmission 2 711 may be an uplink/downlink data channel, an uplink/downlink control channel, an uplink/downlink reference signal, or the like.

In FIG. 7, since downlink transmission 1 710 through carrier A 710 in slot n−1 and uplink transmission 2 711 through carrier B 711 in slot n are influenced by TA 712 and carrier A 701 and carrier B 702 may not be synchronized, the transmission areas of downlink transmission 1 710 and uplink transmission 2 711 may overlap in the time domain (indicated by reference numerals 714 and 715). Accordingly, a self-interference problem may occur in downlink reception 1 710 of the terminal, due to harmonics and inter-modulation products generated in the case where uplink transmissions overlap in the time domain. Therefore, in this case, a method is provided such that the terminal performs only downlink reception or uplink transmission at one time so as to prevent simultaneous transmission and reception operations from colliding.

First, in the case where LTE transmission and 5G transmission are simultaneously performed, the terminal always prioritizes LTE transmission. That is, LTE transmission is completely performed without dropping a symbol, and transmission or reception of an overlapping portion or an entirety of a 5G transmission temporally overlapping the LTE transmission is dropped. The terminal acquires LTE synchronization through a specific carrier and determines that the transmission or reception through the carrier is LTE transmission by performing an LTE transmission or reception operation through a specific carrier through reception of system information according to the LTE standard, performing random access, RRC connection, transmission or reception of control/data channel/reference signal, and the like. In addition, the terminal acquires 5G synchronization through a specific carrier and determines that the transmission or reception through the carrier is 5G transmission by performing 5G transmission or reception through a specific carrier through reception of system information according to 5G standard, performing of random access, RRC connection, transmission or reception of control/data channel/reference signal, and the like.

If downlink transmission 1 710 is LTE and uplink transmission 2 711 is 5G, the terminal receives downlink transmission 1 710 completely, and does not transmit a portion 715 of uplink transmission 2 711, which overlaps a portion 714 of downlink transmission 1 710 in the time domain, but transmits only the remaining portions of uplink transmission 2 711. Alternatively, if there is a portion 715 of uplink transmission 2 711 that overlaps the portion 714 in the time domain, the terminal drops uplink transmission 2 711. In the case where uplink transmission 2 711 is an uplink control channel, if only the remaining portion of uplink transmission 2 711 is transmitted without transmitting a portion 715 of uplink transmission 2 711, the terminal may transmit a short PUCCH instead of the long PUCCH.

Alternatively, the terminal may transmit the number of symbols of long PUCCH, obtained by subtracting the number of symbols of the portion 715 from X1 and changing the number of symbols of the long PUCCH to X2, which is smaller than X1. For example, if X1 is 14 and the portion 715 is 2 symbols, X2 may be determined to be 12. The 5G base station assumes rate mapping or puncturing for the reception of uplink transmission 2 711 and decodes the same. That is, the 5G base station assumes that there is no portion 715 in uplink transmission 2 711 or maps "0" thereto, maps uplink channel/reference signals using only the remaining portions, and performs decoding thereof. In this case, the terminal also assumes that there is no portion 715 in uplink transmission 2 711, and needs to map the uplink channel/reference signal using only the remaining portions and perform transmission thereof. The TA1 712 may be exchanged through a backhaul (X2 or Xn interface) between the LTE and 5G base stations.

If downlink transmission 1 710 is 5G and uplink transmission 2 711 is LTE, the terminal does not receive the portion 714 of downlink transmission 1 710 that overlaps the portion 715 in uplink transmission 2 711 in the time domain in the case of receiving downlink transmission 1 710. Further, uplink transmission 2 711 is completely performed. Alternatively, if there is a portion 714 of downlink transmission 1 710 that overlaps the portion 715 in the time domain, the terminal does not receive downlink transmission 1 710 and transmits a NACK requesting retransmission of downlink transmission 1 710 to the base station. The terminal assumes puncturing for reception of downlink transmission 1 710 and decodes the same. That is, the terminal maps 0 to the portion 714 as a reception value and decodes downlink transmission 1 710. The TA 712 may be exchanged between the LTE and the 5G base station through a backhaul (X2 or Xn interface), and the terminal transmits the TA 712 configured by the LTE base station to the 5G base station via an uplink control/data channel.

Secondly, in the case where 5G reception and 5G transmission are performed at the same time, the terminal performs 5G transmission or reception based on a priority described below.

As the first method of determining the priority, if downlink transmission 1 710 is 5G and uplink transmission 2 711 is 5G, the terminal gives priority to the transmission that is transmitted earlier in time. That is, the terminal receives downlink transmission 1 710 completely, and does not transmit a portion 715 of uplink transmission 2 711 that overlaps a portion 714 of downlink transmission 1 710 in the time domain, but only transmit the remaining portions of uplink transmission 2 711. If the uplink transmission is performed earlier than the downlink transmission, the terminal transmits the uplink transmission completely and does not receive the downlink transmission of the portion overlapping the uplink transmission portion, and receives only the remaining portions of the downlink transmission based on rate mapping or puncturing.

The second method of determining the priority is to prioritize transmission or reception performed in a primary cell. If downlink transmission 1 710 is an downlink transmission performed in the primary cell, and uplink transmission 2 711 is an uplink transmission performed in a secondary cell, the terminal receives downlink transmission 1 710 completely, and transmits only the remaining portion of uplink transmission 2 711 without transmitting the portion 715 of uplink transmission 2 711, which overlaps the portion 714 of downlink transmission 1 710 in the time domain.

In another embodiment, in the case where a carrier for downlink transmission 1 710 and a carrier for uplink transmission 2 711 are identical, a guard interval for switching RF by a terminal is required, and in order to obtain the guard interval, the terminal completely receives downlink transmission 1 710, and transmits only the remaining portions of uplink transmission 2 711 without transmitting the portion 715 of uplink transmission 2 711. Alternatively, in order to obtain the guard interval, the terminal receives only the remaining portions of downlink transmission 1 710 without receiving the portion 714 of downlink transmission 1 710, and completely transmits uplink transmission 2 711.

In another embodiment, according to whether an area in which a downlink control channel needs to be searched for or a downlink reference signal is included in 5G downlink 1 710, if 5G downlink transmission 1 710 includes the area and the downlink reference signal, the terminal drops the portion 715 of uplink transmission 2 711, and if not, the terminal may drop the portion 714 of downlink transmission 1 710. The reason that the above terminal operation can be applied is as follows. In the case where an area in which a downlink control channel needs to be searched for or transmission of a downlink reference signal for decoding is configured, if the area is dropped by the terminal, the terminal may not receive a downlink data channel or may not transmit an uplink data channel, indicated by scheduling of the downlink control channel. Accordingly, a priority may be given to an area in which the downlink control channel is searched for or an area including a downlink reference signal for decoding. The configuration of the area in which the downlink control channel is searched for may be indicated to the terminal by means of an uplink layer signal, and the terminal performs downlink channel search in the indicated resource area, through reception of the signal. For the downlink reference signal, a transmission area may be determined according to a standard, and a transmission position may be identified depending on whether a slot-based transmission or a mini-slot-based transmission is configured according to a higher layer signal. The terminal may determine a resource area of the downlink reference signal based on the transmission position.

Figure 8:
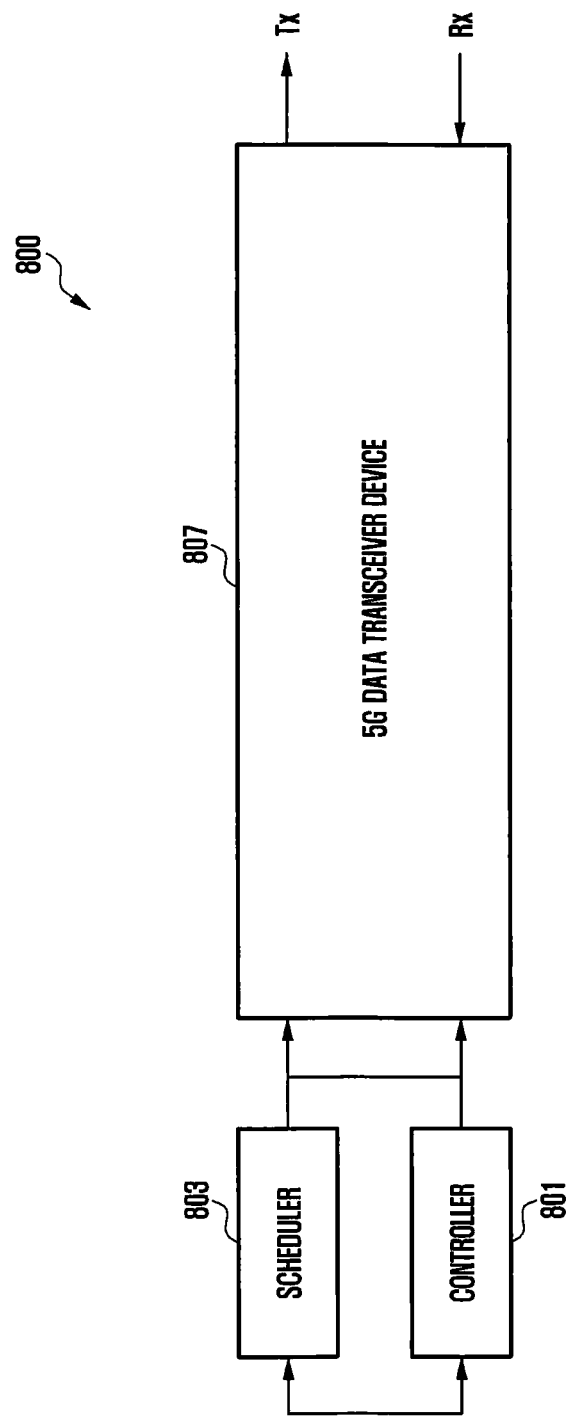
FIG. 8 illustrates a base station device according to the disclosure.

Next, FIG. 8 illustrates a base station device 800 according to the disclosure.

A controller 801 configures a plurality of carriers for the terminal according to the base station procedure according to FIGS. 3A to 3C, FIGS. 4A to 4C, and FIGS. 5A to 5C of the disclosure and FIGS. 6 and 7 of the disclosure. In the case where transmission or reception to or from a terminal through each carrier is performed, the controller 801 controls transmission or reception of a data/control channel and a reference signal of LTE/5G according to a method for performing only one uplink or downlink transmission at a time by a terminal according to the disclosure. A scheduler 803 schedules LTE and 5G data, and transmits or receives data to or from the terminal through an LTE and 5G data transceiver device 807.

Figure 9:
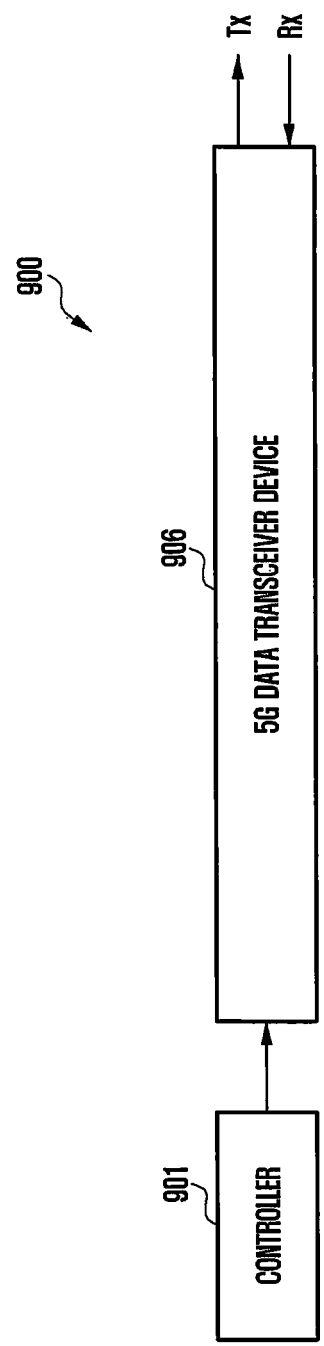
FIG. 9 illustrates a terminal device according to the disclosure.

FIG. 9 illustrates a terminal device 900 according to the disclosure.

Figure 3:
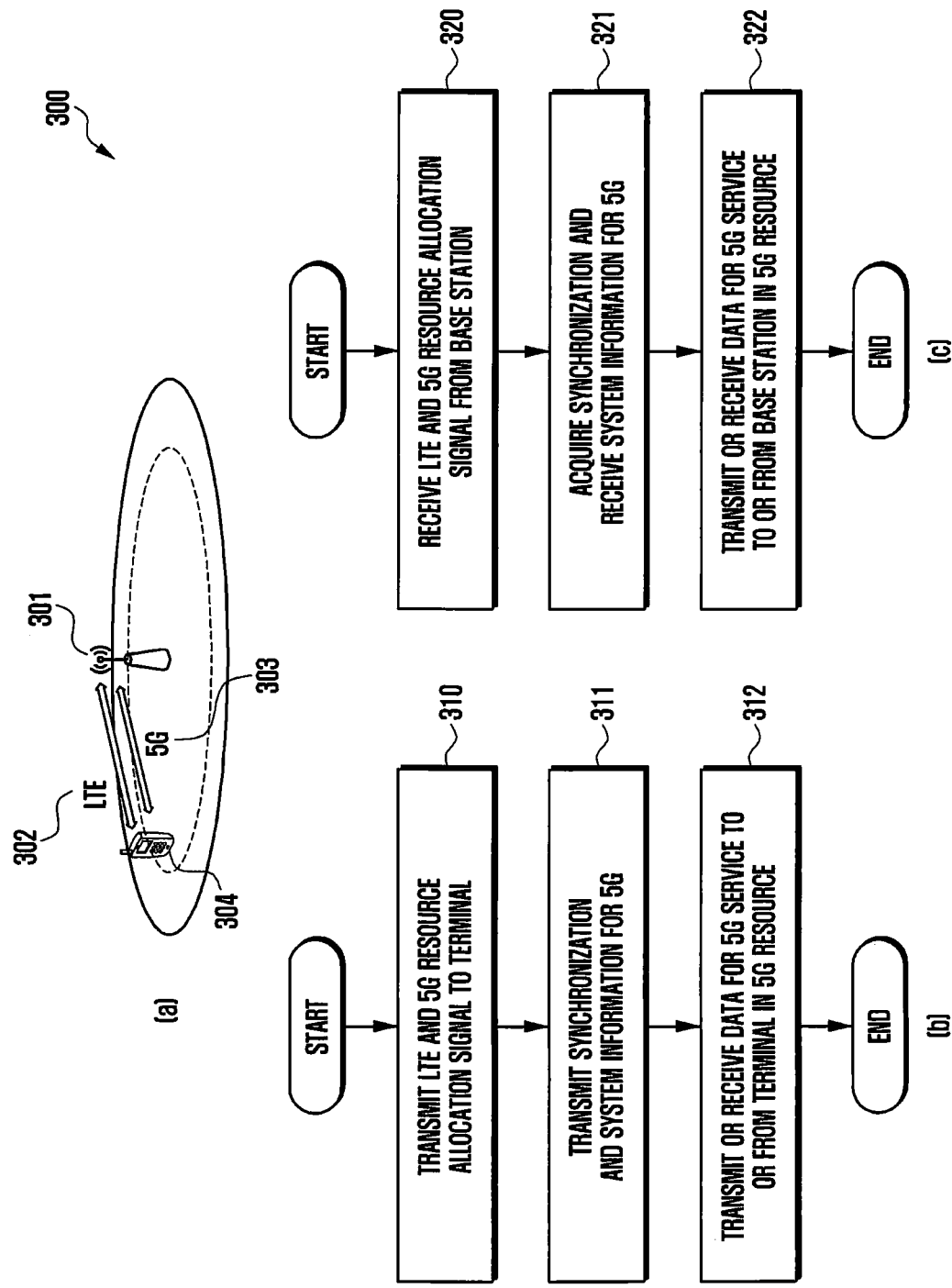
FIGS. 3A to 3C illustrate a first communication system to which the disclosure is applied.
Figure 4:
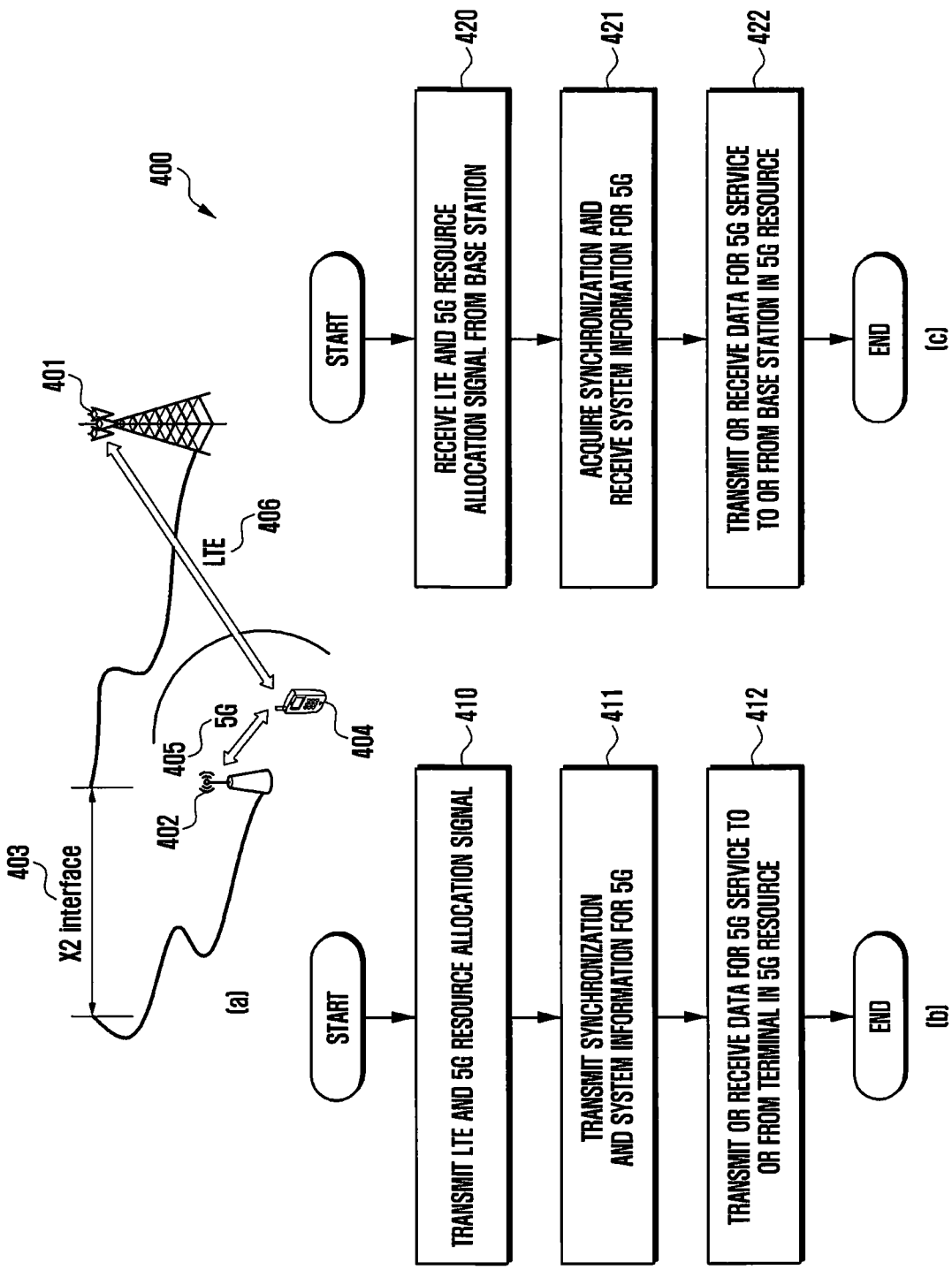
FIGS. 4A to 4C illustrate a second communication system to which the disclosure is applied.

A controller 901 receives configurations of the plurality of carriers from a base station according to the terminal procedure according to FIGS. 3, 4 and 5 of the disclosure and FIGS. 6 and 7. In the case where transmission or reception to or from a base station through each carrier is performed, the controller 901 controls transmission or reception of a data/control channel and a reference signal of LTE/5G according to a method for performing only one uplink or downlink transmission at a time by a terminal according to the disclosure. The controller 901 receives scheduling of LTE and 5G data from a base station, and transmits or receives data to or from the base station through an LTE and 5G data transceiver device 906.

Embodiments of the disclosure disclosed in the specification and the drawings are only particular examples to easily describe the technical matters of the disclosure and assist in understanding of the disclosure, and do not limit the scope of the disclosure. It will be apparent to those skilled in the art that other modified examples based on the technical idea of the disclosure will be implemented as well as the embodiments disclosed herein. Further, if necessary, the above respective embodiments may be employed in combination.

The invention claimed is:

1. A method performed by a terminal in a wireless communication system, the method comprising:
 receiving, from a base station, configuration information including first information on a first transmission interval of a first signal scheduled for a first cell, and second information on a second transmission interval of a second signal scheduled for a second cell, wherein the first signal is associated with a first physical uplink control channel (PUCCH) and the second signal is associated with a second PUCCH;
 identifying whether the first transmission interval overlaps with at least a portion of the second transmission interval in a time domain;
 in case that the first transmission interval overlaps with the at least the portion of the second transmission interval in the time domain, identifying a priority between the first signal and the second signal, wherein the priority is determined based on information included in the first PUCCH and the second PUCCH;
 in case that the first signal is associated with the first PUCCH including hybrid automatic repeat request (HARQ) acknowledgement/negative acknowledgement (ACK/NACK) information and the second signal is associated with the second PUCCH including channel information, determining that the second signal has a lower priority than the first signal;
identifying an uplink transmission waveform of the second signal having the lower priority than the first signal;
in case that the uplink transmission waveform of the second signal corresponds to discrete Fourier transform-spread-orthogonal frequency division multiplexing (DFT-S-OFDM), transmitting, to the base station, a non-overlapped portion of the second signal; and
in case that the uplink transmission waveform of the second signal corresponds to cyclic prefix-OFDM (CP-OFDM), the second signal is dropped.

2. The method of claim 1,
wherein the priority between the first signal and the second signal is determined based on at least one of a communication system of the first signal and the second signal, a sequence of the first transmission interval and the second transmission interval on the time axis, a channel type of the first signal and the second signal, a type of information included in the first signal and the second signal, and a transmission power of the first signal and the second signal.

3. The method of claim 1, wherein identifying whether the first transmission interval overlaps with the at least portion of the second transmission interval comprises comparing a timing advance (TA) for the first signal with a TA for the second signal.

4. A terminal in a wireless communication system, the terminal comprising:
a transceiver; and
at least one processor configured to:
receive, from a base station, configuration information including first information on a first transmission interval of a first signal scheduled for a first cell, and second information on a second transmission interval of a second signal scheduled for a second cell, wherein the first signal is associated with a first physical uplink control channel (PUCCH) and the second signal is associated with a second PUCCH,
identify whether the first transmission interval overlaps with at least a portion of the second transmission interval in a time domain,
in case that the first transmission interval overlaps with the at least the portion of the second transmission interval in the time domain, identify a priority between the first signal and the second signal, wherein the priority is determined based on information included in the first PUCCH and the second PUCCH,
in case that the first signal is associated with the first PUCCH including hybrid automatic repeat request (HARQ) acknowledgement/negative acknowledgement (ACK/NACK) information and the second signal is associated with the second PUCCH including channel information, determine that the second signal has a lower priority than the first signal,
identify an uplink transmission waveform of the second signal having the lower priority than the first signal,
in case that the uplink transmission waveform of the second signal corresponds to discrete Fourier transform-spread-orthogonal frequency division multiplexing (DFT-S-OFDM), transmit, to the base station, a non-overlapped portion of the second signal, and
in case that the uplink transmission waveform of the second signal corresponds to cyclic prefix-OFDM (CP-OFDM), the second signal is dropped.

5. The terminal of claim 4, wherein the priority between the first signal and the second signal is determined based on at least one of a communication system of the first signal and the second signal, a sequence of the first transmission interval and the second transmission interval on the time axis, a channel type of the first signal and the second signal, a type of information included in the first signal and the second signal, and transmission power of the first signal and the second signal.

6. The terminal of claim 4, wherein the at least one processor is further configured to compare a timing advance (TA) for the first signal with a TA for the second signal so as to identify whether the first transmission interval overlaps with the at least portion of the second transmission interval.

7. A method performed by a base station in a wireless communication system, the method comprising:
transmitting, to a terminal, configuration information including first information on a first transmission interval of a first signal scheduled for a first cell, and second information on a second transmission interval of a second signal scheduled for a second cell, wherein the first signal is associated with a first physical uplink control channel (PUCCH) including hybrid automatic repeat request (HARQ) acknowledgement/negative acknowledgement (ACK/NACK) information and the second signal is associated with a second PUCCH including channel information;
in case that an uplink transmission waveform of the second signal having a lower priority than the first signal corresponds to discrete Fourier transform-spread-orthogonal frequency division multiplexing (DFT-S-OFDM), receiving from the terminal, a non-overlapped portion of the second signal; and
in case that the uplink transmission waveform of the second signal having the lower priority than the first signal corresponds to cyclic prefix-OFDM (CP-OFDM), the second signal is dropped,
wherein the terminal is configured with the first cell and the second cell,
wherein the first transmission interval overlaps with at least portion of the second transmission interval,
wherein a priority between the first signal and the second signal is based on information included in the first PUCCH and the second PUCCH, and
wherein the second signal associated with the second PUCCH including channel information is determined to have the lower priority than the first signal associated with the first PUCCH including the HARQ ACK/NACK information.

8. The method of claim 7, wherein whether the first transmission interval and the second transmission interval overlap each other is determined by comparing a timing advance (TA) for the first signal and a TA for the second signal.

9. A base station in a wireless communication system, the base station comprising:
a transceiver; and
at least one processor configured to:
transmit, to a terminal, configuration information including information on a first transmission interval of a first signal scheduled for a first cell, and information on a second transmission interval of a second signal scheduled for a second cell, wherein the first signal is associated with a first physical uplink control channel (PUCCH) including hybrid automatic repeat request (HARQ) acknowledgement/negative acknowledgement (ACK/NACK) information and the second signal is associated with a second PUCCH including channel information, in case that an uplink transmission waveform of the second signal having a lower priority than the first signal corresponds to discrete Fourier transform-spread-orthogonal frequency division multiplexing (DFT-S-OFDM), receive from the terminal, a non-overlapped portion of the second signal, and in case that the uplink transmission waveform of the second signal having the lower priority than the first signal corresponds to cyclic prefix-OFDM (CP-OFDM), the second signal is dropped, wherein the terminal is configured with the first cell and the second cell, wherein the first transmission interval overlaps with at least portion of the second transmission interval wherein a priority between the first signal and the second signal is based on information included in the first PUCCH and the second PUCCH, and wherein the second signal associated with the second PUCCH including channel information is determined to have the lower priority than the first signal associated with the first PUCCH including the HARQ ACK/NACK information.

10. The base station of claim 9, wherein the priority between the first signal and the second signal is determined based on at least one of a communication system of the first signal and the second signal, a sequence of the first transmission interval and the second transmission interval on the time axis, a channel type of the first signal and the second signal, a type of information included in the first signal and the second signal, and a transmission power of the first signal and the second signal.

11. The base station of claim 9, wherein whether the first transmission interval and the second transmission interval overlap each other is determined by comparing a timing advance (TA) for the first signal and a TA for the second signal.

* * * * *